United States Patent
Goodenough et al.

(10) Patent No.: US 9,676,153 B2
(45) Date of Patent: *Jun. 13, 2017

(54) VINYL ALCOHOL OPHTHALMIC LENS MOLDS, OPHTHALMIC LENSES MOLDED THEREIN, AND RELATED METHODS

(75) Inventors: Neil Goodenough, Southampton (GB); David Robert Morsley, Eastleigh (GB); Ian Bruce, Southampton (GB); Edyta S. Bialek, Southampton (GB); Lee Darren Norris, Southampton (GB)

(73) Assignee: CooperVision International Holding Company, LP, St. Michael (BB)

( * ) Notice: Subject to any disclaimer, the term of this patent is extended or adjusted under 35 U.S.C. 154(b) by 751 days.

This patent is subject to a terminal disclaimer.

(21) Appl. No.: 13/810,677

(22) PCT Filed: Jun. 13, 2011

(86) PCT No.: PCT/GB2011/051101
§ 371 (c)(1),
(2), (4) Date: Mar. 13, 2013

(87) PCT Pub. No.: WO2012/013946
PCT Pub. Date: Feb. 2, 2012

(65) Prior Publication Data
US 2013/0169927 A1 Jul. 4, 2013

Related U.S. Application Data

(60) Provisional application No. 61/369,116, filed on Jul. 30, 2010.

(51) Int. Cl.
*B29D 11/00* (2006.01)
*B29C 33/40* (2006.01)
(Continued)

(52) U.S. Cl.
CPC ...... *B29D 11/00038* (2013.01); *A45C 11/005* (2013.01); *B29C 33/40* (2013.01);
(Continued)

(58) Field of Classification Search
CPC ........ B29D 11/00413; B29D 11/00009; B29D 11/0038; B29D 11/0048; G02C 7/04; G02B 1/043; B29C 33/40; B29C 45/26
See application file for complete search history.

(56) References Cited

U.S. PATENT DOCUMENTS 3,190,843 A 6/1965 Hofelmann et al.
4,143,949 A 3/1979 Chen
(Continued)

FOREIGN PATENT DOCUMENTS

EP 1882576 A1 1/2008
EP 1930243 A1 6/2008
(Continued)

OTHER PUBLICATIONS

Lai et al., "Surface wettability enhancement of silicone hydrogel lenses by processing with polar plastic molds," J. Biomed Mater Res., 35, 1997, pp. 349-356.
(Continued)

*Primary Examiner* — Mathieu Vargot
(74) *Attorney, Agent, or Firm* — Kilyk & Bowersox, P.L.L.C.

(57) ABSTRACT

Ophthalmic lens molds made from at least one vinyl alcohol copolymers with high amorphous content, ophthalmic lenses including silicone hydrogel contact lenses formed using these molds, packaged ophthalmic lenses present in a solution comprising the at least one vinyl alcohol copolymer with high amorphous content, and related methods are described. The methods of manufacturing ophthalmic lenses can use wet demolding, delensing or demolding and delens-
(Continued)

ing processes involving dissolving the molds in water or an aqueous solution.

17 Claims, 1 Drawing Sheet

(51) Int. Cl.
 *G02B 1/04*  (2006.01)
 *B29C 45/26*  (2006.01)
 *A45C 11/00*  (2006.01)
 *B65D 75/36*  (2006.01)
 *B65D 81/22*  (2006.01)
 *C08L 83/04*  (2006.01)
 *B29L 11/00*  (2006.01)
 *B29K 83/00*  (2006.01)

(52) U.S. Cl.
 CPC ........ *B29C 45/26* (2013.01); *B29D 11/00009* (2013.01); *B29D 11/0048* (2013.01); *B29D 11/00413* (2013.01); *B65D 75/36* (2013.01); *B65D 81/22* (2013.01); *C08L 83/04* (2013.01); *G02B 1/043* (2013.01); *B29K 2083/00* (2013.01); *B29K 2823/12* (2013.01); *B29K 2829/04* (2013.01); *B29K 2995/006* (2013.01); *B29K 2995/0025* (2013.01); *B29K 2995/0062* (2013.01); *B29L 2011/0041* (2013.01); *C08L 2201/50* (2013.01); *C08L 2203/02* (2013.01)

(56) References Cited

U.S. PATENT DOCUMENTS

| | | |
|---|---|---|
| 5,326,505 A | 7/1994 | Adams et al. |
| 5,502,106 A | 3/1996 | LaFleur et al. |
| 5,542,978 A | 8/1996 | Kindt-Larsen et al. |
| 5,779,943 A | 7/1998 | Enns et al. |
| 5,789,461 A | 8/1998 | Nicolson et al. |
| 6,310,116 B1 | 10/2001 | Yasuda et al. |
| 6,465,538 B2 | 10/2002 | Lai |
| 6,511,617 B1 | 1/2003 | Martin et al. |
| 6,867,245 B2 | 3/2005 | Iwata et al. |
| 7,320,587 B2 | 1/2008 | Goodenough et al. |
| 7,540,609 B2 | 6/2009 | Chen et al. |
| 7,691,916 B2 | 4/2010 | McCabe et al. |
| 7,750,079 B2 | 7/2010 | Almond et al. |
| 2003/0002009 A1 | 1/2003 | Shono |
| 2003/0235669 A1 | 12/2003 | Yang et al. |
| 2005/0013842 A1 | 1/2005 | Qiu et al. |
| 2005/0147778 A1 | 7/2005 | Tai et al. |
| 2006/0063852 A1 | 3/2006 | Iwata et al. |
| 2006/0073185 A1 | 4/2006 | Jani et al. |
| 2006/0251696 A1 | 11/2006 | Winterton et al. |
| 2006/0284327 A1 | 12/2006 | Yamamichi |
| 2007/0035049 A1 | 2/2007 | Bruce et al. |
| 2007/0138692 A1 | 6/2007 | Ford et al. |
| 2007/0149428 A1 | 6/2007 | Ammon, Jr. et al. |
| 2007/0216045 A1 | 9/2007 | Francis |
| 2007/0284770 A1 | 12/2007 | Ansell et al. |
| 2008/0001317 A1 | 1/2008 | Tokarski et al. |
| 2008/0029914 A1 | 2/2008 | Hamanaka |
| 2008/0239237 A1 | 10/2008 | Ansell et al. |
| 2008/0290534 A1 | 11/2008 | Yin et al. |
| 2008/0307751 A1 | 12/2008 | Newman et al. |
| 2009/0121370 A1 | 5/2009 | Barrows et al. |
| 2009/0146329 A1 | 6/2009 | Yin et al. |
| 2009/0166904 A1 | 7/2009 | Lawton et al. |
| 2009/0244445 A1 | 10/2009 | Nakamura et al. |
| 2009/0317616 A1 | 12/2009 | Kawai et al. |
| 2011/0060445 A1* | 3/2011 | Heenan ............... B29C 67/0055 700/119 |
| 2013/0161846 A1 | 6/2013 | Goodenough et al. |
| 2013/0162943 A1 | 6/2013 | Goodenough et al. |
| 2013/0169926 A1 | 7/2013 | Goodenough et al. |
| 2013/0176530 A1 | 7/2013 | Goodenough et al. |
| 2013/0188125 A1 | 7/2013 | Goodenough et al. |

FOREIGN PATENT DOCUMENTS

| | | |
|---|---|---|
| EP | 2181836 A2 | 5/2010 |
| GB | 2481761 B | 9/2012 |
| GB | 2485015 B | 12/2012 |
| JP | 5549288 B2 | 12/1980 |
| JP | 63-046232 | 2/1988 |
| JP | 11-172149 | 6/1999 |
| JP | 11-287971 | 10/1999 |
| JP | 2004-075866 | 3/2004 |
| JP | 2004314416 A | 11/2004 |
| JP | 2006-089538 | 4/2006 |
| JP | 2009-542470 A | 12/2009 |
| WO | 0117756 A1 | 3/2001 |
| WO | 0170490 A2 | 9/2001 |
| WO | 2008-002398 A2 | 1/2008 |
| WO | 2008005201 A2 | 1/2008 |
| WO | 2008021822 A3 | 2/2008 |
| WO | 2009025845 A1 | 2/2009 |
| WO | 2010011492 A1 | 1/2010 |
| WO | 2010011493 A1 | 1/2010 |
| WO | 2010065686 A1 | 6/2010 |
| WO | 2010078150 A1 | 7/2010 |

OTHER PUBLICATIONS

Hassan et al., "Structure and Applications of Poly(vinyl alcohol) Hydrogels Produced by Conventional Crosslinking or by Freezing/Thawing Methods," Advances in Polymer Science, vol. 153, Springer-Verlag Berlin Heidelberg 2000, pp. 37-65.
Hodgkinson et al., "Thermoplastic Poly (Vinyl Alcohol) (PVOH)," Materials World, vol. 8, pp. 24-25, Apr. 2000.
"Nichigo G-Polymer—Biodegradable, High Barrier, Water Soluble, Extrusion Polymer," 2010 Place Conference, Apr. 18-21, 2010, Albuquerque, New Mexico USA.
Tohei Moritani, "Molecular Structures and Functional Modifications of Poly(Vinyl Alcohol)," May 1998 (14 pages).
Extracts from Gohsenol.com (Nippon Gohsei), printed from<http://www.gohsenol.com/doc_e/spcl/spcl_01/spcl_11.shtml> on Apr. 28, 2015, (6 pages).
Keeping Up With Technology—Vinyl Alcohol Polymers Are Moldable and Extrudable, Plastics Technology, Jul. 2009, Gardner Business Media, Inc. Cincinnati Ohio.
Office Action received in Japanese Patent Application No. 2013-522298 dated Oct. 16, 2014 with English translation (10 pages).
Office Action received in Japanese Patent Application No. 2013-522299 dated Nov. 5, 2014 with English translation (6 pages).
Technical data sheet for DMS-R18 from Gelest, 1 page, undated.
International Search Report and Written Opinion issued in corresponding International Patent Application No. PCT/GB2011/051101 dated Nov. 9, 2011.

* cited by examiner

VINYL ALCOHOL OPHTHALMIC LENS MOLDS, OPHTHALMIC LENSES MOLDED THEREIN, AND RELATED METHODS

This application is a National Stage Application of PCT/GB2011/051101, filed Jun. 13, 2011, which claims priority to U.S. Provisional Patent Application No. 61/369,116, filed Jul. 30, 2010.

FIELD

The present disclosure relates to ophthalmic lens molds comprising at least one vinyl alcohol copolymer with high amorphous content, ophthalmic lenses cast molded using at least one of these vinyl alcohol copolymer molds, and related methods. More particularly, the disclosure relates to contact lens molds made from at least one vinyl alcohol copolymer with an average level of crystallinity of about 30% or less, contact lenses cast molded using at least one these molds, and methods of using these molds in the manufacture of contact lenses, including silicone hydrogel contact lenses.

BACKGROUND

In cast molding methods of producing ophthalmic lenses, such as contact lenses, a reaction mixture or polymerizable lens precursor composition is cured in a lens shaped cavity defined by a first mold member with a concave lens forming surface and a second mold member with a convex lens forming surface, or a female and male mold member, respectively. The mold members are typically produced by injection molding a thermoplastic polymer into mold shaped cavities. Examples of thermoplastic polymers used to make ophthalmic lens molds include non-polar thermoplastic polymers, such as polypropylene, polystyrene, and polyethylene; and polar thermoplastic polymers, such as ethylene-vinyl alcohol copolymers and poly(vinyl alcohol) homopolymers. When cast molding a contact lens, after placing the polymerizable composition in the first mold member, the first and second mold members are placed together or coupled together to form a lens assembly with the lens shaped cavity therebetween. The mold assembly is then cured to polymerize the polymerizable composition, forming the polymerized lens body in the lens shaped cavity of the mold assembly.

Contact lenses, including silicone hydrogel contact lenses, have been cast molded in molds made of ethylene-vinyl alcohol (EVOH) copolymers with high crystalline content (and low amorphous content), for example SOAR-LITE™ S available from Nippon Gohsei, Ltd., Osaka, Japan. Some EVOH copolymers have levels of crystallinity of about 40% or higher. Molding silicone hydrogel lenses in EVOH molds has been found to result in lenses having ophthalmically acceptably wettable surfaces. Previously, it was necessary to apply a surface treatment such as, for example a plasma treatment, or to include an interpenetrating network of a polymeric wetting agent in silicone hydrogel contact lenses in order for the lens surfaces to be ophthalmically acceptably wettable when hydrated. However, EVOH is an expensive material, which negatively impacts production costs. Molds made of EVOH typically are harder and more brittle than would be ideal, and it can be difficult to release the lens body from the mold members of the mold assembly following curing, which negatively impacts lens yields and costs.

It has also been proposed to use forms of poly(vinyl alcohol) (PVOH), including modified forms of PVOH, to form contact lens molds. While these forms of PVOH appear attractive due to their water solubility, they are not ideal for use as contact lens molds. For example, as the traditional melt processing temperature and thermal degradation temperature of pure PVOH are almost the same, it is very difficult to use these materials to injection mold contact lens molds. While some modified forms of PVOH have been proposed for use as contact lens molds, these modified forms of PVOH still retain some of the undesirable properties of pure PVOH, such as high crystalline content that reduces light transmission through the material, slow dissolution in water at lower temperatures, and portions of the material may not dissolve completely. Further, aqueous solutions of pure or modified PVOH can gel or foam easily, and the materials may produce cloudy aqueous solutions. Although the prospect of a contact lens mold that could be dissolved in water would be attractive, these undesirable properties make it difficult to use pure or modified forms of PVOH in commercial production of contact lenses.

In view of the above, it can be appreciated that a need exists for contact lens molds comprising new types of materials for cast molding ophthalmic lenses including silicone hydrogel contact lenses, new ophthalmic lenses cast molded using molds comprising these new types of materials, and associated manufacturing methods which use less expensive, more process-friendly molding materials. A need exists particularly for materials that can be injection molded in order to form contact lens molds which can be used to cast mold silicone hydrogel contact lenses that has ophthalmically acceptably wettable lens surfaces without application of a surface treatment such as plasma to the lens body, or without the presence of components in the lens forming composition that form an interpenetrating network (IPN) of a wetting agent in the lens body during curing of the lens.

All publications, including patents, published patent applications, scientific or trade publications and the like, cited in this specification are hereby incorporated herein in their entirety.

SUMMARY

In a first example, the present disclosure is directed to a method of manufacturing an ophthalmic lens, comprising: providing at least one vinyl alcohol copolymer with high amorphous content, using the at least one vinyl alcohol copolymer with high amorphous content to form at least one of a first mold member and a second mold member, the first mold member comprising a concave molding surface configured to mold an anterior surface of a lens and the second mold member comprising a convex molding surface configured to mold a posterior surface of a lens, the first mold member and the second mold member configured to form a lens-shaped cavity therebetween when combined as a mold assembly; placing a polymerizable composition comprising at least one hydrophilic monomer in the first mold member or the second mold member; assembling the mold assembly by contacting the first mold member and the second mold member so as to form the lens-shaped cavity therebetween, with the polymerizable composition contained in the lens-shaped cavity of the mold assembly; and curing the polymerizable composition in the mold assembly to form a cast-molded polymerized reaction product in the lens-shaped cavity of the mold assembly, the polymerized reaction product comprising an ophthalmic lens body.

In one example, the at least one vinyl alcohol copolymer with high amorphous content is at least one vinyl alcohol copolymer with an average level of crystallinity from about 10% to about 30%, or from about 15% to about 25%, or from about 17% to about 20%.

In another example, the at least one vinyl alcohol copolymer with high amorphous content has a melting point from about 140° C. to about 190° C., or from about 155° C. to about 180° C., or from about 160° C. to about 172° C.

In yet another example, the at least one vinyl alcohol copolymer with high amorphous content has a glass transition temperature from about 60° C. to about 85° C., from about 65° C. to about 80° C., or from about 70° C. to about 76° C.

In one example, the at least one vinyl alcohol copolymer with high amorphous content is a polar polymer.

In one particular example, the at least one vinyl alcohol copolymer with high amorphous content comprises Nichigo G-POLYMER™ (Nippon Gohsei, Osaka, Japan).

In one example of the method of manufacturing an ophthalmic lens, the step of placing a polymerizable composition in the first mold member or the second mold member comprises placing a polymerizable composition comprising at least one silicone monomer, silicone macromer, silicone prepolymer, or combination thereof, and at least one hydrophilic monomer in the first mold member, and wherein the ophthalmic lens body comprises a silicone hydrogel contact lens body.

In another example of the method of manufacturing an ophthalmic lens, the method of using the at least one vinyl alcohol copolymer with high amorphous content to form at least one of the first mold member and the second mold member comprises injection molding the at least one of the first mold member and the second mold member. In other words, one or both of the two mold members comprise the at least one vinyl alcohol copolymer with high amorphous content, and one or both of the two mold members are made by injection molding the at least one vinyl alcohol copolymer with high amorphous content. In one example, the step of injection molding the at least one of the first mold member and the second mold member comprises forming a molding surface of at least one of the first mold member and the second mold member completely by injection molding. In other words, the molding surface of one or both of the two mold members are formed entirely by injection molding the at least one vinyl alcohol copolymer with high amorphous content, as opposed, for example, to forming the molding surface by a combination of molding and lathing, lathing or ablating. In another example, the step of injection molding the at least one of the first mold member and the second mold member comprises forming a body of at least one of the first mold member and the second mold member by injection molding, and forming a molding surface of the at least one of the first mold member and the second mold member by machining, lathing or ablating the injection molded body. In yet another example, the method of injection molding can comprise injection molding the at least one vinyl alcohol copolymer with high amorphous content using a process setting selected from the group comprising: melt temperature from about 180° C. to about 250° C., barrel temperature from about 180° C. to about 250° C., throat temperature from about 30° C. to about 70° C., mold tool temperature from about 30° C. to about 95° C., holding time from about 1 second to about 5 seconds, injection speed from about 50 mm/second to about 250 mm/second, plasticizing speed from about 100 mm/second to about 300 mm/second, injection pressure from about 50 Bar to about 180 Bar, holding pressure from about 10 Bar to about 200 Bar, back pressure from about 5 Bar to about 25 Bar., and any combination thereof.

In another example of the method of manufacturing an ophthalmic lens, the step of using the at least one vinyl alcohol copolymer with high amorphous content to form at least one of the first mold member and the second mold member comprises using the at least one vinyl alcohol copolymer with high amorphous content to form a molding surface on the at least one of the first mold member and the second mold member; the non-molding region of the at least one of the first mold member and the second mold member being formed of a second material, and wherein the step of placing the polymerizable composition in the first mold member or the second mold member comprises placing the polymerizable composition in direct contact with the molding surface comprising the at least one vinyl alcohol copolymer with high amorphous content. In other words, the at least one vinyl alcohol copolymer can be used to form the molding surface of a mold, and one or more other polymers can be used to form non-molding surfaces of the mold.

In another example of the method of manufacturing an ophthalmic lens, the lens body has ophthalmically acceptably wettable anterior and posterior surfaces without application of a surface treatment to the lens body, or without the presence of components in the polymerizable composition that form an interpenetrating network (IPN) of a wetting agent in the lens body during the curing.

In another example of the method of manufacturing an ophthalmic lens, the method further comprises the step of separating the first mold member and the second mold member. The step of separating the first mold member and the second mold member can comprise a wet demolding step, where the lens remains in contact with just one of the two mold members at the end of the step; or a simultaneous wet demolding and wet delensing step, where the lens is released from both the first mold member and the second mold member at the end of the step. In one example, when the separating results in the lens body remaining in contact with one and only one of the first mold member and the second mold member, the one and only one of the first mold member and the second mold member being the at least one of the first mold member and the second mold member comprising the at least one vinyl alcohol copolymer with high amorphous content. In other words, the step of separating the first mold member and the second mold member can result in the lens remaining in contact with a mold member comprising the at least one vinyl alcohol copolymer with high amorphous content.

In another example, the step of separating the cured mold assembly comprises applying a liquid to the at least one of the first mold member and the second mold member comprising the at least one vinyl alcohol copolymer with high amorphous content, resulting in the at least one of the first mold member and the second mold member comprising the at least one vinyl alcohol copolymer with high amorphous content at least partially dissolving in the liquid. In other words, the lens can be separated from a mold member comprising the at least one vinyl alcohol copolymer with high amorphous content by applying a liquid to the mold member and dissolving the mold member in the liquid. The step of applying the liquid can further comprise agitating the liquid, or agitating the at least one of the first mold member and the second mold member comprising the at least one vinyl alcohol copolymer with high amorphous content. The dissolving the at least one of the first mold member and the second mold member comprising the at least one vinyl alcohol copolymer with high amorphous content can be conducted at a temperature of about 70° C. or less, and the at least one of the first mold member and the second mold member comprising the at least one vinyl alcohol copolymer with high amorphous content can be completely dissolved in less than about 240 minutes. The mold member comprising the at least one vinyl alcohol copolymer with high amorphous content can be completely dissolved in less than about 180 minutes, less than about 120 minutes, less than about 60 minutes, or less than about 30 minutes. In one example, the dissolving the at least one of the first mold member and the second mold member comprising the at least one vinyl alcohol copolymer with high amorphous content in the liquid does not result in the production of a foam, a cloudy solution, a gel, or a combination thereof, that is disruptive to the manufacturing process. Said another way, the dissolving can result in the production of a low level of a foam, a cloudy solution, a gel, or a combination thereof that is not disruptive to the manufacturing process.

In another example of the method of manufacturing an ophthalmic lens, the method further comprises the step of washing the released lens body to produce a washed lens body. The liquid used in the washing step can comprise an organic solvent, an aqueous solution of an organic solvent, water, or an aqueous solution essentially free of an organic solvent, including an aqueous solution essentially free of a volatile alcohol, such as, for example, an aqueous salt solution or an aqueous surfactant solution.

In another example of the method of manufacturing an ophthalmic lens, the method further comprises the step of placing the mold assembly including the cured lens body in the lens-shaped cavity in a blister package with a packaging solution, and sealing and sterilizing the package, wherein the mold assembly is fully dissolved in the packaging solution following sterilization.

In yet another example of the method of manufacturing an ophthalmic lens, wherein the molding surface of at least one of the first mold member and the second mold member comprises the at least one vinyl alcohol copolymer with high amorphous content, and the non-molding region of the at least one first mold member or the second mold member is formed of an at least one polymeric material that is insoluble in the packaging solution and is configured for use as a blister package.

In another example, the present disclosure is directed to a silicone hydrogel contact lens body, comprising: a cast-molded polymerized lens body comprising the reaction product of a polymerizable composition, the polymerizable composition comprising at least one silicone monomer, silicone macromer, silicone prepolymer or any combination thereof, and at least one hydrophilic monomer; wherein the lens body is cast-molded in a mold assembly comprising a first mold member and a second mold member, at least one of the first mold member and the second mold member comprising at least one vinyl alcohol copolymer with high amorphous content.

In another example, the present disclosure is directed to a packaged silicone hydrogel contact lens body, comprising: a blister package formed of a hydrophobic polymer material; a cast-molded polymerized lens body comprising the reaction product of a polymerizable composition, the polymerizable composition comprising at least one silicone monomer, silicone macromer, silicone prepolymer or any combination thereof, and at least one hydrophilic monomer; and a liquid comprising the dissolution product of at least one vinyl alcohol copolymer with high amorphous content in a packaging solution.

In yet another example, the present disclosure is directed to a mold member for cast molding a silicone hydrogel contact lens body, comprising: a mold member comprising a molding surface and a non-molding region, wherein at least the molding surface of the mold member comprises at least one vinyl alcohol copolymer with high amorphous content.

Any and all features described herein and any combination of such features are included within the scope of the present application provided that the features of any such combination are not mutually inconsistent. In addition, any feature or combination of features may be specifically excluded from any example of the present disclosure.

DETAILED DESCRIPTION

Figures 1, 2:
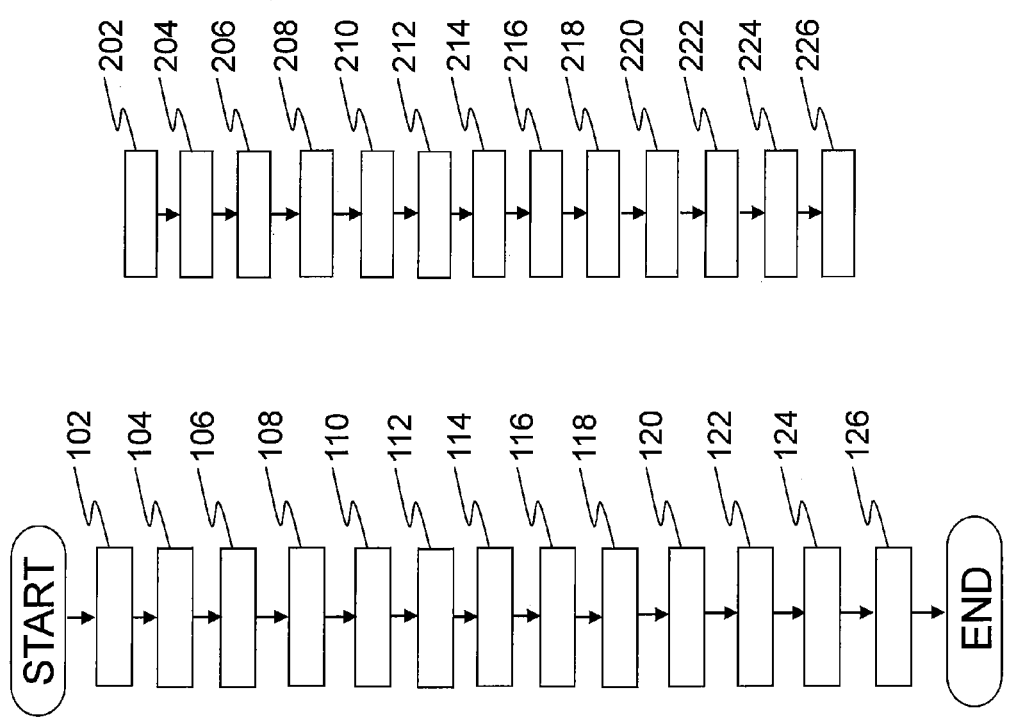
FIG. 1 is a flow chart illustrating steps of a method for producing an ophthalmic lens.
FIG. 2 is a flow chart illustrating certain inputs and outputs of the method of FIG. 1.

It has been discovered that ophthalmic lens molds made of vinyl alcohol copolymers with high amorphous content can be used to cast mold ophthalmic lens bodies. Ophthalmic lens can be demolded, delensed or both demolded and delensed from molds made partially or entirely of one or more vinyl alcohol copolymers with high amorphous content using "wet" demolding, delensing or both demolding and delensing methods, i.e. methods involving the application of a liquid to the lens body and the mold assembly or a mold member. Ophthalmic lenses can also be demolded, delensed or both demolded and delensed using "dry" demolding, delensing, or both demolding and delensing methods, i.e., methods which do not involve application of a liquid to the lens body and the mold assembly or a mold member. Unlike molds made of materials with poor aqueous solubility, molds made of at least one vinyl alcohol copolymer with high amorphous content can be used to produce lens bodies that can be demolded, delensed or both demolded and delensed by partially or completely dissolving the mold member(s) made of vinyl alcohol copolymers with high amorphous content in water or an aqueous solution. Unlike molds made of pure PVOH, the molds made of vinyl alcohol with high amorphous content can be formed by injection molding, or can be formed by compression molding, continuous compression molding, thermoforming, etc. Unlike molds made of modified forms of PVOH, the molds made of at least one vinyl alcohol copolymer with high amorphous content can be rapidly and completely dissolved in liquids such as water and aqueous solutions, including water and aqueous solutions a low temperatures, and the solutions of the at least one vinyl alcohol copolymer formed by dissolving the molds in a liquid do not present manufacturing difficulties such as, for example, excessive foaming, gelation of the liquid, or the liquid becoming cloudy due to the dissolved vinyl alcohol copolymer. Further, use of these molds made of at least one vinyl alcohol copolymer with high amorphous content to mold silicone hydrogel contact lenses can result in lens bodies having surfaces that are ophthalmically acceptably wettable without application of a surface treatment to the lens surfaces and without the presence of components in the polymerizable composition that form an interpenetrating network (IPN) of a polymeric wetting agent in the lens body.

As used herein, a vinyl alcohol copolymer is a polymer comprising of units of vinyl alcohol and units of a monomer that is not vinyl alcohol. This is distinct from a vinyl alcohol homopolymer, which is a polymer comprising only repeating units of vinyl alcohol, i.e., poly(vinyl alcohol) (PVOH), or a modified form of PVOH such as a form of PVOH combined with ingredients that allow the PVOH to be injection molded, such as, for example, plasticizers. The vinyl alcohol copolymer with high amorphous content can comprise a vinyl alcohol copolymer with high vinyl alcohol content, or with low vinyl alcohol content. The vinyl alcohol copolymer can comprise a percentage of vinyl alcohol units in the polymer chain greater than or equal to about 95%, greater than or equal to about 90%, greater than or equal to about 85%, greater than or equal to about 80%, greater than or equal to about 75%, greater than or equal to about 70%, greater than or equal to about 65%, greater than or equal to about 60%, greater than or equal to about 55%, greater than or equal to about 50%, greater than or equal to about 45%, greater than or equal to about 40%, greater than or equal to about 35%, greater than or equal to about 30%, greater than or equal to about 25%, greater than or equal to about 20%, greater than or equal to about 15%, greater than or equal to about 10%, greater than or equal to about 5%, or less than or equal to about 5%. The percentage of vinyl alcohol units in the polymer chain can be expressed as on a weight percent basis, or a molar percent basis.

The vinyl alcohol copolymer with high amorphous content can be a vinyl alcohol copolymer other than an ethylene-vinyl alcohol copolymer (i.e., a copolymer comprised of units of ethylene and units of vinyl alcohol). The vinyl alcohol copolymer with high amorphous content can be a vinyl alcohol copolymer essentially free of ethylene units.

The vinyl alcohol copolymer with high amorphous content can be a polymer composed of three or more different monomeric units, wherein one of the monomeric units (e.g., the first unit) comprises vinyl alcohol. In one example of a trimer, the first monomeric unit can comprise vinyl alcohol, the second and third monomeric units can comprise monomeric units other than ethylene or vinyl alcohol, or one of the monomeric units (e.g., the second unit) can comprise ethylene when the other one of the monomeric units (e.g., the third) does not comprise ethylene or vinyl alcohol.

The term "vinyl alcohol copolymer with high amorphous content" refers to a vinyl alcohol copolymer containing a large number of amorphous regions and thus few crystalline regions, i.e., few regions of three-dimensional ordering on atomic length scales. In polymers, crystalline regions can arise from intramolecular folding of the polymer, from stacking of adjacent polymer chains, or from both. Polymers can contain both crystalline and amorphous regions. Degree of crystallinity is commonly used to describe the crystalline content of a given polymer, with a degree of crystallinity of 0 indicating a completely non-crystalline (amorphous) polymer and a degree of crystallinity of 1 indicating a completely crystalline polymer. Crystalline content can also be expressed as a percentage, with an average level of crystallinity of 0% indicating a completely non-crystalline (amorphous) polymer and an average level of crystallinity of 100% indicating a completely crystalline polymer The degree or level of crystallinity can be determined using differential scanning calorimetry (DSC). The degree or level of crystallinity can be determined using DSC by heating a sample of the polymer at a heating rate of 10° C./minute from 0° C. to 250° C., and determining the degree or level of crystallinity based on the first cooling and heating cycle conducted on the same. As used herein, the vinyl alcohol copolymer with high amorphous content is understood to be a vinyl alcohol copolymer with an average level of crystallinity from about 0% to about 35%, including, for example, a vinyl alcohol copolymer with an average level of crystallinity less than or equal to about 30%, less than or equal to about 25%, less than or equal to about 20%, from about 10% to about 30%, from about 15% to about 25%, or from about 17% to about 20%.

The vinyl alcohol copolymer with high amorphous content can be a thermoplastic vinyl alcohol copolymer, i.e., a vinyl alcohol copolymer that becomes liquid or malleable when heated and freezes to a glassy state when sufficiently cooled, and which can be repeatedly re-melted and re-molded.

The vinyl alcohol copolymer with high amorphous content can be an extrudable vinyl alcohol copolymer, i.e., a vinyl alcohol copolymer that can be processed by pushing or drawing the copolymer through a die for form an object of a desired shape.

The vinyl alcohol copolymer with high amorphous content can be a vinyl alcohol copolymer suitable for injection molding, i.e., a vinyl alcohol copolymer that can be processed by heating the copolymer to a fluid state and injecting it into a mold to form an object of a desired shape. The vinyl alcohol copolymer suitable for injection molding can have a melting point below its decomposition temperature. For example, the melting point can be more than about 20° C., more than about 40° C., more than about 60° C., more than about 80° C., or more than about 100° C. below the decomposition temperature of the copolymer. In one example, the decomposition temperature of the vinyl alcohol copolymer is about 300° C.

In one example, the melting point of the vinyl alcohol copolymer can be from about 140° C. to about 190° C., from about 155° C. to about 180° C., from about 160° C. to about 172° C., or from about 150° C. to about 230° C. In another example, the glass transition temperature of the vinyl alcohol copolymer can be from about 60° C. to about 85° C., from about 65° C. to about 80° C., or from about 70° C. to about 76° C.

The vinyl alcohol copolymer with high amorphous content is soluble in water and aqueous solutions. The vinyl alcohol copolymer can rapidly dissolve in water and aqueous solutions. The vinyl alcohol copolymer can dissolve in water and aqueous solutions leaving no residue detectable to the naked eye. In one example, the vinyl alcohol copolymer can dissolve in water at a temperature from about 30° C. to about 80° C. in less than about 20 minutes to form a 6% solution of the vinyl alcohol copolymer.

The vinyl alcohol copolymer with high amorphous content, while having good aqueous solubility, can be practically insoluble in ethyl acetate, benzene and toluene.

In one particular example, the vinyl alcohol copolymer with high amorphous content is Nichigo G-Polymer™ manufactured by Nippon Gohsei, Osaka, Japan.

The vinyl alcohol copolymer with high amorphous content can be used to cast mold various types of polymerizable lens forming compositions. The polymerizable composition can comprise at least one hydrophilic monomer. The polymerizable composition can further comprise at least one crosslinker, at least one initiator, at least one tinting agent, at least one UV blocker, and any combination thereof. The at least one initiator can comprise at least one UV initiator or at least one thermal initiator. In one example, the hydrophilic monomer can comprise a silicone-free monomer such as, for example, 2-hydroxyethyl methacrylate (HEMA).

The polymerizable lens forming composition can be a silicone hydrogel polymerizable composition. The silicone hydrogel polymerizable composition can comprise a) at least one silicone monomer, at least one silicone macromer, at least one silicone prepolymer, or combination thereof, and b) at least one hydrophilic monomer. In one example of the silicone hydrogel polymerizable composition, the hydrophilic monomer can comprise a hydrophilic monomer with an N-vinyl group. In another example, the silicone hydrogel polymerizable composition can further comprise a form of silicone oil. In yet another example the silicone hydrogel polymerizable composition can comprise a comfilcon A polymerizable composition, and the polymerized reaction product is a comfilcon A lens body.

As previously discussed, the vinyl alcohol copolymer with high amorphous content can be used to form at least one mold member for molding ophthalmic lenses. The mold member can be produced by conventional injection molding procedures known to persons of ordinary skill in the art. For example, a quantity of the vinyl alcohol copolymer can be heated to form a molten thermoplastic polymer. The molten thermoplastic polymer can be dispensed into a mold cavity in the shape of an ophthalmic lens mold. For example, the mold cavity can include one or two optical quality molding surfaces. The optical quality molding surfaces can be provided as components of one or more removable inserts located in a plate or other housing, or can be integrally machined as part of the molding cavity. The molten thermoplastic polymer in the mold cavity can then be cooled and separated from the molding machine and subsequently moved to a station to receive a volume of a polymerizable composition to be used to form an ophthalmic lens.

The process settings used to injection mold the vinyl alcohol copolymer with high amorphous content can include:

Melt temperature from about 180° C. to about 250° C.
Barrel temperature from about 180° C. to about 250° C.
Throat temperature from about 30° C. to about 70° C.
Mold tool temperature from about 30° C. to about 95° C.
Holding time from about 1 second to about 5 seconds
Injection speed from about 50 mm/second to about 250 mm/second
Plasticizing speed from about 100 mm/second to about 300 mm/second
Injection pressure from about 50 Bar to about 180 Bar
Holding pressure from about 10 Bar to about 200 Bar
Back pressure from about 5 Bar to about 25 Bar.

In one example, at least two of these process settings are used to injection mold the vinyl alcohol copolymer. In another example, three, four, five, six, seven, eight, nine, ten, or all of these process settings are used to injection mold the vinyl alcohol copolymer.

Alternatively, the at least one mold member can be produced by a combination of injection molding and machining, lathing or ablating, for example where the basic shape of the mold member is prepared by injection molding, and all or a portion of the optical quality molding surface is prepared by removing a portion of the mold member, for example by machining, lathing or ablating a portion of the mold member, such as all or a part of the region of the mold used to mold an optical zone of a contact lens.

In another example, the vinyl alcohol copolymer with high amorphous content can be used to form at least a molding surface of a mold member, where at least some of the non-molding portions of the mold member are formed of a material other than the vinyl alcohol copolymer. In one example, a non-molding portion of the mold member can be formed of a material that is essentially insoluble in water or aqueous solutions, such as, for example a metal or polymeric material. In one example, the non-molding portion can comprise a frame or support for a molding surface comprising the vinyl alcohol copolymer. The vinyl alcohol copolymer can be used to form the entire molding surface, or can be used to form a portion of the molding surface, such as a layer of a multilayer molding surface, where the vinyl alcohol copolymer layer is the portion or layer of the multilayer molding surface that directly contacts the polymerizable composition during cast molding. The portion or layer of the molding surface comprising the vinyl alcohol copolymer can be formed using various methods, such as, for example, injection molding or film casting.

The vinyl alcohol copolymer with high amorphous content can be used to form molds configured to cast mold ophthalmic devices. The ophthalmic devices can comprise contact lenses, including silicone hydrogel contact lenses. When the vinyl alcohol copolymer is used to cast mold silicone hydrogel contact lenses, surfaces of the lens body molded using the vinyl alcohol copolymer can be ophthalmically acceptably wettable molded surfaces without application of a surface treatment to the lens body, or without the presence of components in the polymerizable composition used for form the lens body that form an interpenetrating network (IPN) of a wetting agent in the lens body during curing of the lens body.

As used herein, an "ophthalmically compatible silicone hydrogel contact lens" refers to a silicone hydrogel contact lens that can be worn on a person's eye without the person experiencing or reporting substantial discomfort, including ocular irritation and the like. Such lenses often have an oxygen permeability, a surface wettability, a modulus, a water content, an ionoflux, a design, and any combination thereof, which permit the lenses to be comfortably worn on a patient's eye for extended periods of time, such as for at least a day, at least a week, at least two weeks, or about a month without requiring removal of the lens from the eye. Typically, ophthalmically compatible silicone hydrogel contact lenses do not cause or are not associated with significant corneal swelling, corneal dehydration ("dry eye"), superior-epithelial arcuate lesions ("SEALs"), or other significant discomfort. Ophthalmically compatible silicone hydrogel contact lenses meet clinical acceptability requirements for daily wear or extended wear contact lenses.

Ophthalmically compatible silicone hydrogel contact lenses have ophthalmically acceptably wettable surfaces, although a lens with ophthalmically acceptably wettable surfaces may not necessarily be ophthalmically compatible. A silicone hydrogel contact lens having an "ophthalmically acceptably wettable surface" can be understood to refer to a silicone hydrogel contact lens that does not adversely affect the tear film of a lens wearer's eye to a degree that results in the lens wearer experiencing or reporting discomfort associated with placing or wearing the silicone hydrogel contact lens on an eye.

Ophthalmic lenses comprise lens bodies that have surfaces, such as an anterior surface and a posterior surface. As used herein, an ophthalmically acceptable wettable ophthalmic lens is a lens body with surfaces that are all ophthalmically acceptably wettable. Wettability refers to the hydrophilicity of one or more surfaces of a lens. As used herein, a surface of a lens can be considered to be ophthalmically acceptably wettable, if the lens receives a score of 3 or above in a wettability assay conducted as follows. An ophthalmic lens is dipped into distilled water, removed from the water, and the length of time that it takes for the water film to recede from the lens surface is determined (e.g., water break up time (WBUT)). The assay grades lenses on a linear scale of 1-10, where a score of 10 refers to a lens in which a drop takes 20 seconds or more to fall from the lens. A lens having a WBUT of more than 5 seconds, such as at least 10 seconds or more desirably at least about 15 seconds, can be an ophthalmically acceptably wettable lens. Wettability can also be determined by measuring a contact angle on one or both lens surfaces. The contact angle can be a dynamic or static contact angle, a sessile drop contact angle, a pendant drop contact angle, or a captive bubble contact angle. Lower contact angles generally refer to increased wettability of a contact lens surface. For example, an ophthalmically acceptably wettable surface of a lens can have a contact angle less than about 120 degrees. However, in certain examples, the lenses have a contact angle no greater than 90 degrees, and in further examples, the lenses have advancing contact angles less than about 80 degrees.

As described herein, the ophthalmic lenses cast molded using vinyl alcohol copolymers with high amorphous content can have ophthalmically acceptably wettable surfaces when fully hydrated, and may not require application of a surface treatment or the presence of an interpenetrating network of a polymeric wetting agent in the lens body in order for the lens to have ophthalmically acceptably wettable surfaces. However, application of a surface treatment to the lenses or the presence of an interpenetrating network of a polymeric wetting agent in the lens body can be used to further increase the wettability of the lens surfaces above a level that is considered ophthalmically acceptably wettable.

One measure of the ability of a mold member to mold a silicone hydrogel contact lens having ophthalmically acceptably wettable surfaces is the contact angle of the mold member. Contact angles can include dynamic or static contact angle, sessile drop contact angle, a pendant drop contact angle, or a captive bubble contact angle. In one example, the contact angle can be measured using the captive bubble method, and can be performed in purified water using a contact angle tester, such as Model CA-DT manufactured by Kyowa Kaimen Kagaku Co., Ltd. or a Kruss DSA 100 instrument (Kruss GmbH, Hamburg). The measurements can be performed at 25° C.

The process of cast molding contact lens bodies, including silicone hydrogel contact lens bodies, typically begins with the preparation of a pair of mold members (i.e., a first mold member and a second mold member). The mold members can be produced by injection molding a thermoplastic polymer mold material into mold shaped cavities, by lathing the polymer mold material to form the entire mold member, or by a combination of injection molding and lathing, for example, injection molding to form the basic shape of the mold member and then lathing all or part of the lens forming region of the mold member.

Typically, two mold members are combined to cast mold contact lens bodies. The two mold members are sized and structured to be assembled together to define a lens-shaped cavity therebetween. Each of the two mold members can comprise either a concave lens forming surface used to mold an anterior surface of a lens, or a convex lens forming surface used to mold a posterior surface of a lens. For the purposes of this disclosure, the mold member with a concave lens forming surface is referred to as a first mold member or a female mold member, and the mold member with a convex lens forming surface is referred to as a second mold member or a male mold member. The first and second mold members can be structured to form a lens-shaped cavity therebetween when assembled with each other to form a mold assembly.

Alternative mold member configurations, such as, for example, mold assemblies comprising more than two mold members or mold members that are shaped or structured differently than described above, can be used with the vinyl alcohol copolymers with high amorphous content described herein. Additionally, the mold members can be configured to comprise more than one lens forming region. For example, a single mold member can be configured to comprise a region configured to mold an anterior lens surface as well as a posterior lens surface, i.e., to act as either a female or male mold member.

As previously discussed, when vinyl alcohol copolymers with high amorphous content are used to make mold members configured to form a lens-shaped cavity therebetween as a mold assembly, the process of assembling the mold members into a mold assembly can further comprise the step of forming a connection of some sort between the mold members. The first mold member and the second mold member can be structured to be easily separated after being assembled together, preferably without causing substantial damage to at least one of the first and second mold members, and to an ophthalmic lens product produced in the lens shaped cavity. In one example, the mold members can be configured to form a mechanical connection based on the shape of elements of the mold members, such as an interference fit between the mold members, threading between the mold members, bores and protrusions between the mold members, or other locking structures. In another example, a weld can be formed between the mold members by melting a region of one or more of the mold members to adhere the mold members to each other. In another example, an adhesive substance such as a form of glue, contact cement or sealant can be used to form a bond between the mold members. In yet another example, the mold members can be joined using an additional element such as a clip, clamp or bracket. Regardless of the type of connection used between the mold members, the connection is intended to keep the mold members in alignment during the curing process, and needs to be capable of being released before the demolding process or as part of the demolding process.

During the process of manufacturing a lens body, before the individual mold members are combined to form a mold assembly, the polymerizable lens forming composition is filled into the mold members. Typically this is accomplished by placing a predetermined quantity of the polymerizable composition onto one of the mold members, such as, for example, placing the polymerizable composition into the concave molding surface of the first mold member. The mold assembly is then assembled by placing another mold member in contact with the mold member with the polymerizable composition, such as, for example, by placing the convex molding surface of the second mold member in contact with the first mold member such that a lens-shaped cavity is formed between the first and second mold members, the lens-shaped cavity containing the polymerizable composition. If used, the connection is then formed between first and second mold members by whatever means is being used in order to maintain the mold members in proper alignment during the curing process. As previously described, the process of forming the connection can comprise, for example, welding the mold members together, gluing the mold members together, applying pressure to the mold members to engage an interference fit, threading the mold members together, applying a clamp to the mold members, etc.

The mold assembly comprised of the first and second mold members and including the polymerizable composition in the lens-shaped cavity is then cured. Curing the polymerizable composition in the lens-shaped cavity forms a polymerized reaction product in the shape of the lens-shaped cavity, i.e., a lens body. Curing typically comprises application of a form of electromagnetic radiation to the mold assembly including the polymerizable composition in order to cause polymerization of the polymerizable composition in the lens-shaped cavity of the mold assembly. The form of electromagnetic radiation can comprise thermal radiation, visible light, ultraviolet (UV) light, etc. Any combination of two or more forms of electromagnetic radiation, as well as two or more levels of one or more forms of electromagnetic radiation, can be used to cure the mold assemblies. The method of curing is usually matched to the type of initiator used in the polymerizable composition, i.e., a polymerizable composition comprising a UV initiator is usually cured using UV light, and a polymerizable composition comprising a thermal initiator is usually cured using thermal radiation, and usually at a temperature above the initiation temperature of the thermal initiator. Regardless of the method of curing that is used, the temperature during the curing process can be maintained at a temperature below the melting point or below the glass transition temperature of the vinyl alcohol copolymer. The curing process typically involves curing the mold assembly until the polymerizable composition has polymerized sufficiently such that the lens body will retain the shape of the lens-shaped cavity following demolding and delensing. As such, the curing process may not result in complete reaction of all the polymerizable components of the polymerizable composition.

As used herein, "demolding" refers to the process of separating the mold members of the mold assembly following curing of the polymerizable composition. As a result of the demolding process, the two mold members are separated from each other, and the lens body remains in contact (i.e., attached to or adhered to) one and only one of the mold members used to cast mold the lens body.

Dry demolding processes involve the use of mechanical processes to separate the mold members of the mold assembly after curing. In dry demolding processes, the mold assembly including the polymerized lens body is not contacted with a liquid, such as an organic solvent, water or an aqueous solution during the demolding process, and typically the mold assembly including the polymerized lens body has not been exposed to a liquid prior to the dry demolding process. Following a dry demolding process, the polymerized lens body remains in contact with one, and only one, of the mold members used to mold the lens body. In one example, a dry demolding process may include squeezing one or more of the mold members to deform the mold member(s) and to separate the mold members, leaving the polymerized lens body in contact with one of the mold members. If the mold members of the mold assembly are held together at least in part by an interference fit between the mold members, a dry demolding process may include applying pressure to one or more of the mold members in order to push the mold members away from each other to break the interference fit. If the mold members of the mold assembly are held together at least in part by a weld between the mold members, dry demolding may include cutting through the welded material.

Wet demolding processes involve application of a liquid to separate the mold members of the mold assembly after curing. In wet demolding processes, the mold assembly including the polymerized lens body is contacted with a liquid, such as an organic solvent, water or an aqueous solution, during the demolding process. Following a wet demolding process, the polymerized lens body can remain in contact with one, and only one, of the mold members used to mold the lens body, or can be released from both of the mold members used to mold the lens body. Wet demolding processes may include the use of mechanical methods of separating the mold members in addition to application of liquid to the mold assembly, including squeezing one or more of the mold members to deform the mold member(s), applying pressure to one or more of the mold members in order to push the mold members away from each other to break an interference fit, or cutting through welds or an adhesive holding the mold assemblies together.

As part of a wet or dry demolding process, it may be desired to have the lens body remain in contact with a particular mold member, such as either the first or the second mold member, following the demolding process. In order to help the lens body remain in contact with the desired mold member, heat can be applied to the first or second mold member, for example, by blowing heated air on the back of the mold member. Alternatively, the first or second mold member can be chilled, for example by blowing chilled air on the back of the mold member or applying a chilled liquid to one of the mold members. An application of pressure to either the first or second mold member before demolding or concurrently with the demolding process can also help the lens body to remain in contact with a particular mold member (i.e., the first or second mold member) following the demolding process.

As used herein, "delensing" refers to the process of releasing the lens body from the one mold member with which the lens body remains in contact after the mold members of the mold assembly have been separated in a demolding process.

Dry delensing processes involve the use of mechanical processes to release the lens body from the one remaining mold member with which the lens body is in contact following the demolding step. In dry delensing processes, the lens body and the one remaining mold member with which the lens body is in contact are not contacted by a liquid, such as water or an aqueous solution, as part of the delensing process. While it is possible that a wet demolding process (involving application of a liquid to a mold assembly including a polymerized lens body) may be used prior to a dry delensing process, it is more common to use a dry demolding process prior to a dry delensing process. When a dry demolding process and a dry delensing process are used together, the lens body has not been exposed to a liquid, for example an organic solvent, water or an aqueous solution, until after the lens body has been released from both mold members of the mold assembly (i.e., released from both the first and second mold members). In one example, a dry delensing process may involve the use of a vacuum apparatus to lift the polymerized lens body from the one remaining mold member with which it was in contact following the demolding step. A dry delensing process may also involve squeezing the one remaining mold member to at least partially break the bond between the one mold member and the lens body. A dry delensing process may involve inserting a prying tool between the edge of the lens body and the mold member to at least partially break the bond between the lens body and the mold member.

Wet delensing processes involve the application of a liquid such as an organic solvent, water or an aqueous solution to release the lens body from the one remaining mold member with which the lens body is in contact following the demolding step. After or concurrently with application of the liquid, a wet delensing process further comprise using a vacuum apparatus to lift the polymerized lens body from the one remaining mold member with which it was in contact following the demolding step. A wet delensing process may also optionally involve using mechanical means to assist in releasing the lens body, such as, for example, squeezing the one remaining mold member to at least partially break the bond between the one mold member, or inserting a prying tool between the edge of the lens body and the mold member to at least partially break the bond between the lens body and the mold member.

Due to the high water solubility of mold members formed from the vinyl alcohol copolymers with high amorphous content, it is possible to use wet demolding processes, wet delensing processes, or both wet delensing and demolding processes involving application of a liquid to dissolve the vinyl alcohol copolymer mold member(s). In these processes, the mold assembly, mold member(s) or molding surface(s) including the cured lens body can be transferred to a tray before application of the liquid. The tray can comprise separate recesses sized and structured to contain the lens bodies after the mold assembly, mold member(s) or molding surface(s) are dissolved by the liquid. For example, when the mold assembly used to mold the lens body is formed entirely of the vinyl alcohol copolymer, after curing the mold assembly including the cured lens body can be transferred to the tray. In another example, when the molding surfaces of the mold assembly are formed entirely of the vinyl alcohol copolymer and the non-molding portions of the mold assembly are formed of a material insoluble in the liquid, the non-molding portions of the mold assembly can be removed from the molding surfaces of the mold assembly, and the molding surfaces of the mold assembly including the cured lens body can be transferred to the tray. In another example, after demolding, a mold member formed entirely of the vinyl alcohol copolymer and the attached lens body can be transferred to the tray. In yet another example, after demolding, when the molding surface of the one and only one mold member is formed entirely of the vinyl alcohol copolymer, the molding surface and the attached lens body can be transferred to the tray.

The liquid applied in the wet demolding process, the wet delensing process, or both the wet demolding and delensing process can comprise water or an aqueous solution. In one example, the aqueous solution can comprise an aqueous solution of a processing aid which increases the rate of dissolution of the vinyl alcohol copolymer. In another example, the processing aid can be a compound that assists in washing the lens bodies or that assists in the removal of an extractable material from the lens body. In yet another example, the processing aid can be a compound that helps protect the lens body from damage or deformation during processing, such as, for example, a surfactant, including Tween 80.

Immediately before, during or following the step of applying the liquid, the temperature of the liquid can be controlled, for example, in order to maintain the liquid at a temperature which increases the rate of dissolution of the vinyl alcohol copolymer mold member(s).

During or following the step of applying the liquid, the liquid or the mold assembly or mold member can be agitated, for example, to increase the rate of dissolution of the vinyl alcohol copolymer mold member(s). In one particular example, ultrasonic energy can be applied to the liquid, the mold assembly, or the mold member.

For example, the liquid applied to the mold assembly as part of a wet demolding process, or applied to a lens body and one mold member as part of a wet delensing process, can be applied at a temperature of about 90° C. or less, about 80° C. or less, about 70° C. or less, about 60° C. or less, about 50° C. or less, about 40° C. or less, or about 30° C. or less.

The application of the liquid can result in complete dissolution of one or more mold members comprising the vinyl alcohol copolymer in less than about 240 minutes, 180 minutes, 120 minutes, about 90 minutes, about 60 minutes, or about 30 minutes. Alternatively, application of the liquid can result in partial dissolution of one or more mold member comprising the vinyl alcohol copolymer, wherein the partial dissolution of the one or more mold member is sufficient to separate the mold members of the mold assembly (i.e., to demold the mold assembly), to release the lens body from one mold member (i.e., to delens the lens body), or both demold and delens (i.e., completely release the lens body from all the mold members used for form it). For example, the application of liquid can result in greater than 10%, 25%, 50%, 75%, or 90% by weight or volume of the mold member(s) being dissolved.

As previously discussed, due to the superior properties of the vinyl alcohol copolymer with high amorphous content, demolding, delensing or both demolding and delensing processes involving dissolution of the vinyl alcohol copolymer with high amorphous are not severely impacted by some of the problems experienced when dissolving other water soluble polymers in aqueous solutions. For example, PVOH, when dissolved in aqueous solutions can create a large amount of foam, gelation of the solution, a cloudy solution, or any combination of these problems. As the presence of foam, gels or a cloudy solution can be disruptive to mechanical processing and manufacturing steps, additional measures and expenses are required to control or eliminate these problems. Solutions of vinyl alcohol copolymers with high amorphous content that are produced as part of a wet demolding, delensing or both demolding and delensing process involving dissolution of mold members comprising the vinyl alcohol copolymer in water or aqueous solutions do not produce large volumes of foam, even when the liquid and the mold members are agitated. Further, solutions do not gel easily, making it possible to conduct the demolding, delensing or both demolding and delensing processes in large tanks or baths where a single volume of liquid is applied to a plurality of lenses and mold members. As the solution does not gel under these conditions, it is possible to easily empty the solution from the tank or bath and re-fill the tank or bath with fresh or recycled liquid. As the solution of the vinyl alcohol copolymer with high amorphous content in the liquid remains clear, it is possible to observe the lens bodies and the mold members either manually or using an automated system to determine whether or not the lens body has been released from the mold member(s), or whether or not the mold member(s) have dissolved.

Depending upon the type of lens body and the demolding/delensing processes used, following demolding and delensing, the lens body may be subjected to one or more washing steps, including washing steps in an organic solvent, an aqueous solution of an organic solvent, water, or an aqueous solution essentially free of an organic solvent. The washing step can be used to clean dirt or debris from the lens bodies, to extract materials from the lens bodies, or to hydrate the lens bodies. For example, a washing step can be used to remove diluents from the lens body, to remove unreacted or partially reacted monomers, macromers or prepolymers from the lens body, or to increase wettability of the lens body.

In one example, the washing solution can comprise an organic solvent or an aqueous solution of an organic solvent. The organic solvent can comprise a volatile organic solvent such as, for example, a volatile alcohol. Examples of volatile alcohols include forms of methanol, ethanol, propanol, etc.

In another example, the washing solution can comprise water or an aqueous solution essentially free of an organic solvent. The aqueous solution essentially free of an organic solvent used to wash the present lenses can include aqueous salt solutions, buffer solutions, surfactant solutions, wetting agent solutions, comfort agent solutions, any combination thereof, and the like. In one example, one or more polymeric wetting agents or comfort agents can be used to wash the present lenses. However, it is understood that the present lenses can have ophthalmically acceptably wettable surfaces when washed in an aqueous solution that does not contain any polymeric wetting agents or comfort agents. Thus, while the polymeric wetting agents or comfort agents may be used to increase the wettability of such lenses, their wettability is not dependent solely upon the use of such agents.

Following release of the lens body from the mold member(s) and, if used, one or more optional washing steps, the lens body can be placed into a blister package along with a portion of packaging solution. In one example, the blister package can comprise a hydrophobic polymer. The blister package can then be sealed and sterilized, for example, by autoclaving the package under conditions suitable for sterilizing the package. Alternatively, due to the high level of solubility of the vinyl alcohol copolymer with high amorphous content, it is possible to place the lens body and the mold member(s) or molding surface(s) comprising the vinyl alcohol copolymer with high amorphous content directly into the blister package with a portion of solution (without the need to demold, delens or both demold and delens the lens body before placing it in the blister package), and have the mold member(s) or molding surface(s) comprising the vinyl alcohol copolymer dissolve in the packaging solution during or after the manufacturing process.

In one example, when both the first and second mold members are formed entirely of the vinyl alcohol copolymer with high amorphous content, after curing, the mold assembly including the cured lens body can be placed into a blister package with a portion of solution, dissolving the mold members of the mold assembly and avoiding the need to perform separate demolding, delensing and lens transfer processes. In another example, when molding surfaces of both the first mold member and the second mold member are formed entirely of the vinyl alcohol with high amorphous content, after curing, the non-molding portions of the mold members can be removed from the mold assembly, and the molding surfaces and the lens body can be placed in a blister package with a portion of solution, dissolving the molding surfaces and avoiding the need to perform separate demolding, delensing and lens transfer processes. In another example, when the only and only one of the first and second mold members to which the lens body remains attached following demolding is formed entirely of the vinyl alcohol copolymer, after curing and demolding, the one and only one mold member and the attached lens body can be placed into the blister package with a portion of solution, dissolving the one and only one mold member and avoiding the need to perform separate delensing and lens transfer processes. In yet another example, when the molding surface of the one and only one of the first and second mold members to which the lens body remains attached following demolding comprises a molding surface formed entirely of the vinyl alcohol copolymer, after curing, demolding and removing the non-molding portion of the mold member, the molding surface and the attached lens body can be placed into the blister package with a portion of solution, dissolving the molding surface and avoiding the need to perform separate delensing and lens transfer processes.

The mold members(s) or molding surface(s) comprising the vinyl alcohol copolymer can dissolve in the portion of packaging solution before the blister package is sealed, after the blister package is sealed, before the blister package is autoclaved, or after the blister package is autoclaved. For example, before sealing the blister package, after sealing the blister package, before autoclaving the blister package, or after autoclaving the blister package, less than about 15%, less than about 10%, less than about 5%, or less than about 1% by weight of the vinyl alcohol copolymer with high amorphous content added to the blister package can remain undissolved in the blister package.

A device can be used to increase the volume of packaging solution used to dissolve the mold member(s) or molding surface(s) such as the device described in U.S. Patent Application No. 61/313,524, which is hereby incorporated by reference in its entirety. Alternatively, the lens body and mold member(s) or molding surface(s) can be placed in the blister package with a portion of washing solution which is replaced by packaging solution before the blister package is sealed. Again, a device as described in U.S. Patent Application No. 61/313,524 can be used for this purpose.

In one example, when the molding surface of a mold member is formed entirely of the vinyl alcohol copolymer with high amorphous content and the non-molding portion of the mold member is formed of a polymer that is insoluble in water and the packaging solution, the non-molding portion of the mold member can be structured to further serve as a blister package. For example, the non-molding portion of the mold member can be formed of a hydrophobic polymer, such as, for example, polypropylene. The non-molding portion of the mold member can be structured to further comprise a cavity to retain a liquid and a flange extending outwardly from the cavity. In an another example, the non-molding portion of the mold member can be configured to serve as a blister package configured to allow optical inspection of a lens placed in the blister package. The non-molding portion of the mold member can be structured to comprise a cavity to retain a liquid, a flange extending outwardly from the cavity and a bottom wall surface configured to collimate light. Blister packages configured to allow optical inspection of a lens placed in the blister package are described in U.S. Pat. No. 7,477,366, which is hereby incorporated by reference in its entirety.

In the example where the molding surface of a mold member is formed entirely of the vinyl alcohol copolymer with high amorphous content and the non-molding portion of the mold member is configured to serve as a blister package, the method of manufacturing the ophthalmic lens can comprise the step of demolding the mold assembly so that the lens body remains in contact with the mold member configured to serve as a blister package. The process can then include adding packaging solution to the cavity of the blister package to dissolve the molding surface formed of the vinyl alcohol copolymer and release the lens body from the molding surface. The lens can then be optically inspected in the blister package before the blister package is sealed and sterilized.

In the examples where mold member(s) or molding surface(s) formed of the vinyl alcohol copolymer with high amorphous content are dissolved in the packaging solution sealed in the blister package with the lens body, the vinyl alcohol copolymer with high amorphous content can comprise an ophthalmically acceptable ingredient present in the packaging solution. In one example, the vinyl alcohol copolymer with high amorphous content, when dissolved in the packaging solution, can further serve as a wetting agent, a comfort agent, as an agent that prevents the lens body from sticking to the blister package, or any combination thereof.

In one example, the method of manufacturing an ophthalmic lens as described herein results in a yield of acceptable lens bodies that is higher than a yield of acceptable lens bodies made using an essentially identical method but using first and second mold members comprising an ethylene vinyl alcohol copolymer with low amorphous content instead of the at least one vinyl alcohol copolymer with high amorphous content. The yield of acceptable lens bodies can be a yield of cosmetically acceptable lenses, or a yield of ophthalmically acceptable lenses. The yield of acceptable lenses can be a yield of lenses found to be free of visually detectable defects as determined by manual visual inspection or by automated inspection using an automated inspection system. The yield of acceptable lens bodies can be a yield of acceptable lenses resulting from a particular processing step, such as, for example, a curing step, a demolding step, a delensing step, a washing step, a packaging step, a combination of processing steps, etc.

As used herein, the term "hydrogel" refers to a polymeric material, typically a network or matrix of polymer chains, capable of swelling in water or becoming swollen with water. A hydrogel can also be understood to be a material that retains water in an equilibrium state. The network or matrix may or may not be cross-linked. Hydrogels refer to polymeric materials, including contact lenses that are water swellable or are water swelled. Thus, a hydrogel may be (i) unhydrated and water swellable, or (ii) partially hydrated and swollen with water, or (iii) fully hydrated and swollen with water. The hydrogel may be a silicone hydrogel, a silicone-free hydrogel, or an essentially silicone-free hydrogel.

The term "silicone hydrogel" or "silicone hydrogel material" refers to a particular hydrogel that includes a silicon (Si)-containing component or a silicone (SiO)-containing component. For example, a silicone hydrogel is typically prepared by combining a silicon-containing material with conventional hydrophilic hydrogel precursors. A silicone hydrogel contact lens is a contact lens, including a vision correcting contact lens, which comprises a silicone hydrogel material.

A "silicone-containing" component is a component that contains at least one [—Si—O—Si—] linkage, in a monomer, macromer or prepolymer, wherein each silicon atom may optionally possess in some manner, for example, may optionally be chemically, such as covalently, bonded to, one or more organic radical substituents (R1, R2) or substituted organic radical substituents that may be the same or different, e.g., —SiR1R2O—.

"Molecular mass" in the context of a polymer described herein refers to the nominal average molecular mass of a polymer, typically determined by size exclusion chromatography, light scattering techniques, or intrinsic viscosity determination in 1,2,4-trichlorobenzene. Molecular weight in the context of a polymer can be expressed as either a number-average molecular weight or a weight-average molecular weight, and in the case of vendor-supplied materials, will depend upon the supplier. Typically, the basis of any such molecular weight determinations can be readily provided by the supplier if not provided in the packaging material. Typically, references herein to molecular weights of monomers, macromers, prepolymers or polymers herein refer to the weight average molecular weight. Both molecular weight determinations, number-average and weight-average, can be measured using gel permeation chromatographic or other liquid chromatographic techniques. Other methods for measuring molecular weight values can also be used, such as the use of end-group analysis or the measurement of colligative properties (e.g., freezing-point depression, boiling-point elevation, or osmotic pressure) to determine number-average molecular weight or the use of light scattering techniques, ultracentrifugation or viscometry to determine weight-average molecular weight.

A "network" or "matrix" of a hydrophilic polymer typically means that crosslinks are formed between polymer chains by covalent bonds or by physical bonds, e.g. hydrogen bonds. A network can include two or more polymeric components, and can include an interpenetrating network (IPN) in which one polymer is physically entangled with a second polymer such that there are few, if any, covalent bonds between them, but the polymers cannot be separated from each other without destroying the network.

A "hydrophilic" substance is one that is water-loving or has an affinity for water. Hydrophilic compounds have an affinity to water and are usually charged or have polar moieties or groups that attract water.

A "hydrophilic polymer" as used herein is defined as a polymer having an affinity for water and capable of absorbing water. A hydrophilic polymer is not necessarily soluble in water. A hydrophilic polymer may be soluble in water or insoluble, e.g., substantially insoluble, in water.

A "hydrophilic component" is a hydrophilic substance that may or may not be a polymer. Hydrophilic components include those that are capable of providing at least from about 20% (w/w), for example, at least from about 25% (w/w) water content to the resulting hydrated lens when combined with the remaining reactive components. A hydrophilic component can include hydrophilic monomers, hydrophilic macromers, hydrophilic prepolymers, hydrophilic polymers, or any combination thereof. Hydrophilic macromers, hydrophilic prepolymers, and hydrophilic polymers may also be understood to have hydrophilic portions and hydrophobic portions. Typically, the hydrophilic portion and the hydrophobic portion are present in relative amounts such that the macromers, prepolymers, or polymers are hydrophilic.

A "monomer" refers to a relatively low molecular weight compound, for example a compound with an average molecular weight less than 700 Daltons that is polymerizable. In one example, a monomer can comprise a single unit of a molecule containing one or more functional groups capable of polymerizing to combine with other molecules to form a polymer, the other molecules being of the same structure or different structures as the monomer.

A "macromer" refers to medium and high molecular weight compounds or polymers, which can contain one or more functional groups capable of polymerization or further polymerization. For example, a macromer can be a compound or polymer with an average molecular weight of from about 700 Daltons to about 2,000 Daltons.

A "prepolymer" refers to a polymerizable or crosslinkable higher molecular weight compound. A prepolymer, as used herein can contain one or more functional groups. In one example, a prepolymer can be a series of monomers or macromers bonded together such that the overall molecule remains polymerizable or crosslinkable. For example, a prepolymer can be a compound with an average molecular weight greater than about 2,000 Daltons.

A "polymer" refers to a material formed by polymerizing one or more monomers, macromers, prepolymers or mixtures thereof. As used herein, a polymer is understood to refer to a molecule that is not capable of being polymerized, but is capable of being crosslinked to other polymers, for example, to other polymers present in a polymerizable composition or during the reaction of monomers, macromers and/or prepolymers to form other polymers in a polymerizable composition.

An "interpenetrating network" or "IPN" refers to a combination of two or more different polymers, in network form, of which at least one is synthesized (e.g., polymerized) and/or cross-linked in the presence of the other without or substantially without any covalent bonds between them. An IPN can be composed of two kinds of chains forming two separate networks, but in juxtaposition or interpenetrating. Examples of IPNs include sequential IPNs, simultaneous IPNs, semi-IPNs and homo-IPNs.

A "pseudo IPN" refers to a polymeric reaction product where at least one of the different polymers is cross-linked while at least one other polymer is non-crosslinked (e.g. linear or branched), wherein the non-cross-linked polymer is distributed in and held by the cross-linked polymer on a molecular scale such that the non-cross-linked polymer is substantially unextractable from the network.

A "polymeric mixture" refers to a polymeric reaction product wherein different polymers are either linear or branched, substantially without cross-linking, wherein the resulting polymeric blend that is obtained is a polymer mixture on a molecular scale.

A "graft polymer" refers to a branched polymer having side chains comprising a homopolymer or copolymer different to that of the main chain.

"Attach" can refer to any of charge attachment, graft, complex, bond (chemical bond or hydrogen), or adhere, unless specified otherwise.

As used herein, an "ophthalmically acceptable lens forming component" refers to a lens forming component that can be incorporated into a hydrogel contact lens without the lens wearer experiencing or reporting substantial discomfort, including ocular irritation and the like. Ophthalmically acceptable hydrogel contact lenses have ophthalmically acceptable surface wettabilities, and typically do not cause or are not associated with significant corneal swelling, corneal dehydration ("dry eye"), superior-epithelial arcuate lesions ("SEALs"), or other significant discomfort.

The term "organic solvent" refers to an organic substance which has the ability to solvate or dissolve at least one material, for example and without limitation, unreacted materials, diluents and the like, present in a contact lens body which has not previously been subjected to extraction processing. In one example, the material is a material that is not soluble or does not dissolve in water or an aqueous solution. In another example, the material is a material that is not as soluble or does not dissolve as much in water or an aqueous solution, i.e., the material has increased solvation in the organic solvent as compared to water or an aqueous solution. Thus, the organic solvent in contact with such an unextracted contact lens body is effective to solvate or dissolve at least one material present in the lens body, or to increase the solvation or dissolve to a greater extent the at least one material present in the lens body to reduce the concentration of the at least one material in the lens body, or to reduce the concentration of the at least one material in the lens body as compared to a lens body treated with water or an aqueous solution. The organic solvent may be used without dilution, that is 100% organic solvent, or may be used in a composition including less than 100% organic solvent, for example and without limitation, an aqueous solution including an organic solvent. In general, an organic solvent acts, for example, directly acts, on the at least one material to solvate or dissolve the at least one material. Examples of organic solvents include, without limitation, alcohols, e.g., alkanols, such as ethanol, isopropanol and the like, chloroform, butyl acetate, tripropylene glycol methyl ether, dipropylene glycol methyl ether acetate, and the like and mixtures thereof.

The term "surfactant" or "surfactant component" refers to a substance which has the ability to reduce the surface tension of water, for example, water or an aqueous solution in which the substance is present. By reducing the surface tension of the water, the surfactant or surfactant component facilitates the water containing the surfactant or surfactant component, when in contact with a contact lens body which has not previously been subjected to extraction processing with an organic solvent, to more intimately contact the lens body and/or more effectively wash or remove at least one material present in the lens body from the lens body relative to the water without the surfactant or surfactant component. Generally, a surfactant or surfactant component does not act directly on the at least one material to solvate or dissolve the at least one material. Examples of surfactants or surfactant components include, without limitation, zwitterionic surfactants including forms of betaine, non-ionic surfactants including forms of polysorbate such as polysorbate 80, forms of poloxamers or poloxamines, fluorinated surfactants, and the like and mixtures thereof. In one example, one or more surfactants can be incorporated into the polymerizable compositions described herein, in washing liquids described herein, in the packaging solutions described herein, and any combination thereof.

Additional definitions may also be found in the sections that follow.

Lens formulations. Hydrogels represent one class of materials used for the present contact lenses. Hydrogels comprise a hydrated, cross-linked polymeric system containing water in an equilibrium state. Accordingly, hydrogels are copolymers prepared from one or more reactive ingredients. The reactive ingredients are crosslinkable with a crosslinking agent.

Hydrophilic monomer. The hydrophilic monomer can be, for example, a silicone-containing monomer having a hydrophilic portion, a hydrophilic silicone-free monomer, or a combination thereof. The hydrophilic monomer can be used in combination with a hydrophobic monomer. The hydrophilic monomer can be a monomer having both hydrophilic and hydrophobic portions or moieties. The type and amount of hydrophilic monomer used in the polymerizable lens composition can vary depending on the types of other lens-forming monomers that are used. Non-limiting illustrations are provided herein with respect to hydrophilic monomers for use in silicone hydrogels.

Crosslinking Agent. Crosslinking agents for the monomers, macromers, or prepolymers, used in preparing the hydrogels can include those that are known in the art, and examples of the crosslinking agents are also provided herein. Suitable crosslinking agents include, for example, a diacrylate- (or divinyl ether-) functionalized ethylene oxide oligomer or monomer, such as, for example, tri(ethylene glycol) dimethacrylate (TEGDMA) tri(ethylene glycol) divinyl ether (TEGDVE), ethylene glycol dimethacrylate (EGDMA), and trimethylene glycol dimethacrylate (TMGDMA). Typically, the crosslinking agents are present in the polymerizable silicone hydrogel composition in relatively small total amounts in the polymerizable composition, such as in an amount ranging from about 0.1% (w/w) to about 10% (w/w), or from about 0.5% (w/w) to about 5% (w/w), or from about 0.75% (w/w) to about 1.5% (w/w), by weight of the polymerizable composition.

In some examples, one or more of the monomers, macromers or prepolymers may comprise crosslinking functionality. In such cases, the use of an additional crosslinker in addition to the monomer, macromer or prepolymer with crosslinking functionality is optional, and the monomer, macromer or prepolymer with crosslinking functionality may be present in the polymerizable silicone hydrogel composition in a larger amount, such as, for example, at least about 3% (w/w), at least about 5% (w/w), at least about 10% (w/w), or at least about 20% (w/w).

Silicone Hydrogel Polymerizable Lens Forming Composition. A silicone hydrogel polymerizable lens forming composition can comprise at least one silicone-containing component and at least one compatible hydrophilic monomer. In some examples, the polymerizable composition can further comprise at least one compatible crosslinking agent. In particular examples, the silicone-containing component may act as both a crosslinker and as a silicone-containing component. With respect to polymerizable compositions as discussed herein, "compatible" components refers to components which, when present in a polymerizable composition prior to polymerization, form a single phase that is stable for a duration of time adequate to allow manufacture of a polymerized lens body from the composition. For some components, a range of concentrations may be found to be compatible. Additionally, "compatible" components are components which, when polymerized to form a polymerized lens body, produce a lens that has adequate physical characteristics to be used as a contact lens (e.g., adequate transparency, modulus, tensile strength, etc.)

Silicone-containing component. The Si and attached O portion (Si—O portion) of the silicone-containing component can be present in the silicone-containing component in an amount greater than 20% (w/w), for example greater than 30% (w/w), of the total molecular weight of the silicone-containing component. Useful silicone-containing components comprise polymerizable functional groups such as vinyl, acrylate, methacrylate, acrylamide, methacrylamide, N-vinyl lactam, N-vinylamide, and styryl functional groups. The silicone-containing component from which the present contact lenses may be obtained, for example, by polymerization, include one or more silicone-containing monomers, one or more silicone-containing macromers, one or more silicone-containing prepolymers, or mixtures thereof. Silicone hydrogel contact lenses produced as described herein can be based on a silicone-containing monomer and/or a silicone-based macromer and/or a silicone-based prepolymer, and a hydrophilic monomer or co-monomer, and a crosslinking agent. In addition to the other silicone-containing compounds described herein, examples of still further silicone-containing components that may be useful in the present lenses can be found in U.S. Pat. Nos. 3,808,178, 4,120,570, 4,136,250, 4,139,513, 4,153,641, 4,740,533, 5,034,461, 5,496,871, 5,959,117, 5,998,498, and 5,981,675, and U.S. Patent Application Publication Nos. 2007/0066706 A1, 2007/0296914 A1, and 2008/0048350 A1, all of which are incorporated in their entireties herein by reference. The silicone-containing component can be a silicone-containing monomer or a silicone-containing macromer or a silicone-containing prepolymer.

A silicone-containing monomer, macromer, or prepolymer can have, for example, the following general structure (I):

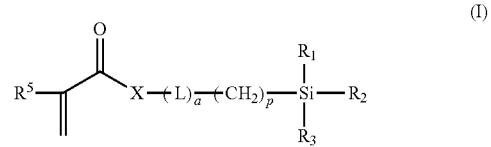

where $R^5$ is H or $CH_3$, X is O or $NR^{55}$ where $R^{55}$ is H or a monovalent alkyl group with 1 to 4 carbon atoms, a is 0 or 1, L is a divalent linking group which comprises from 1 to 20 carbon atoms, or from 2 to 10 carbon atoms, which can also optionally comprise ether and/or hydroxyl groups, for example, a polyethylene glycol chain, p can be from 1 to 10, or from 2 to 5, $R_1$, $R_2$, and $R_3$ can be the same or different and are groups independently selected from hydrocarbon groups having 1 to about 12 carbon atoms (e.g., methyl groups), hydrocarbon groups substituted with one or more fluorine atoms, a siloxanyl group, and siloxane chain-containing moieties, wherein at least one of $R_1$, $R_2$, and $R_3$ comprises at least one siloxane unit (—OSi). For example, at least of one of $R_1$, $R_2$, and $R_3$ can comprise —OSi$(CH_3)_3$ and/or —OSi$(R^{52}R^{53}R^{54})$ where $R^{52}$, $R^{53}$ $R^{54}$ are independently ethyl, methyl, benzyl, phenyl or a monovalent siloxane chain comprising from 1 to about 100, or from about 1 to about 50, or from about 1 to about 20, repeating Si—O units.

One, two, or all three of $R_1$, $R_2$, and $R_3$ can also comprise other siloxanyl groups or siloxane chain-containing moieties. The combined linkage of —X-L-, where present in a silicone-containing monomer, macromer or prepolymer of structure (I), can contain one or more heteroatoms that are either O or N. The combined linkage can be straight chain or branched, where carbon chain segments thereof can be straight chain. The combined linkage of —X-L- can optionally contain one or more functional groups selected from, e.g., carboxyl, amide, carbamate, and carbonate. Examples of such combined linkages are provided, for example, in U.S. Pat. No. 5,998,498 and U.S. Pat. Application Publication Nos. 2007/0066706 A1, 2007/0296914 A1, and 2008/0048350, all the disclosures of which are incorporated herein by reference. The silicone-containing monomer, macromer or prepolymer used in accordance with the present disclosure can comprise a single unsaturated or acryloyl group, such as shown in structure (I), or optionally can possess two unsaturated or acryloyl groups, such as one at each terminus of the monomer, monomer or prepolymer. Any combination of both types of the silicone-containing monomers, macromers or prepolymers optionally can be used in polymerizable compositions useful in accordance with the present disclosure.

Examples of silicone-containing components useful in accordance with the present disclosure include, for example and without limitation, polysiloxanylalkyl (meth)acrylic monomers, macromers or prepolymers including, without limitation, methacryloxypropyl tris(trimethylsiloxy)silane, pentamethyldisiloxanyl methylmethacrylate, and methyldi(trimethylsiloxy)methacryloxymethyl silane.

Specific examples of the useful silicone-containing monomers, macromers or prepolymers can be, for example, 3-[tris(trimethylsilyloxy)silyl]propyl methacrylate ("Tris" available from Gelest, Morrisville, Pa., USA), and monomethacryloxypropyl terminated polydimethylsiloxane ("MCS-M11" available from Gelest, Morrisville, Pa., USA). Examples of some silicone-containing monomers are disclosed in US Patent Application Publication No. 2008/0269429. These silicone-containing monomers can have an alkylene group as a divalent linkage group (e.g., —$(CH_2)_p$—) and "a" can be 0 with reference to structure (I), and at least two siloxanyl groups. These silicone-containing components are designated herein as Structure (A) class silicone-containing monomers. Exemplary non-limiting structures of these silicone-containing monomers are shown as follows:

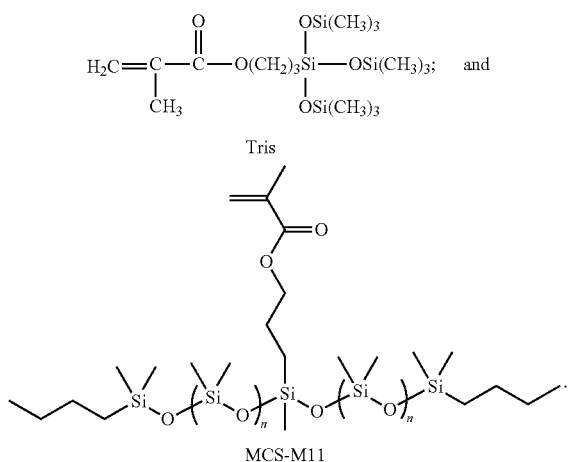

Other specific examples of silicone-containing components useful in the present disclosure can be, for example, 3-methacryloxy-2-hydroxypropyloxy)propylbis (trimethylsiloxy) methylsilane ("SiGMA", available from Gelest, Morrisville, Pa., USA) and methyldi(trimethylsiloxy)sylyl-propylglycerolethyl methacrylate ("SiGEMA"). These silicone-containing components include at least one hydroxyl group and at least one ether group in the divalent linking group L shown in structure (I) and at least two siloxanyl groups. These silicone-containing components are designated herein as Structure (B) class silicone-containing components. Additional examples and details on this class of silicone-containing components are provided, for example, in U.S. Pat. No. 4,139,513, which is incorporated in its entirety herein by reference. SiGMA, for example, can be represented by the following exemplary non-limiting structure:

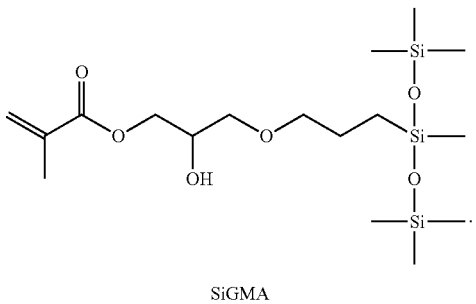 [SMILES: C=C(C)C(=O)OCC(O)COCCC[Si](C)(O[Si](C)(C)C)O[Si](C)(C)C]

Silicone-containing components of Structures (A) and (B) can be used individually or in any combination thereof in polymerizable compositions useful in accordance with the present disclosure. Silicone-containing components of structures (A) and/or (B) may be further used in combination with at least one silicone-free hydrophilic monomer such as described herein. If used in combination, for example, the amount of silicone-containing components of Structure (A) can be, for example, from about 10% (w/w) to about 40% (w/w), or from about 15% (w/w) to about 35% (w/w), or from about 18% (w/w) to about 30% (w/w). The amount of silicone-containing components of Structure (B) can be, for example, from about 10% (w/w) to about 45% (w/w), or from about 15% (w/w) to about 40% (w/w), or from about 20% (w/w) to about 35% (w/w).

Other specific examples of the useful silicone-containing components useful in accordance with the present disclosure can be chemicals represented by the following formulas, or chemicals described in Japanese patent application publication number 2008-202060A, which is hereby incorporated by reference in its entirety, for example,

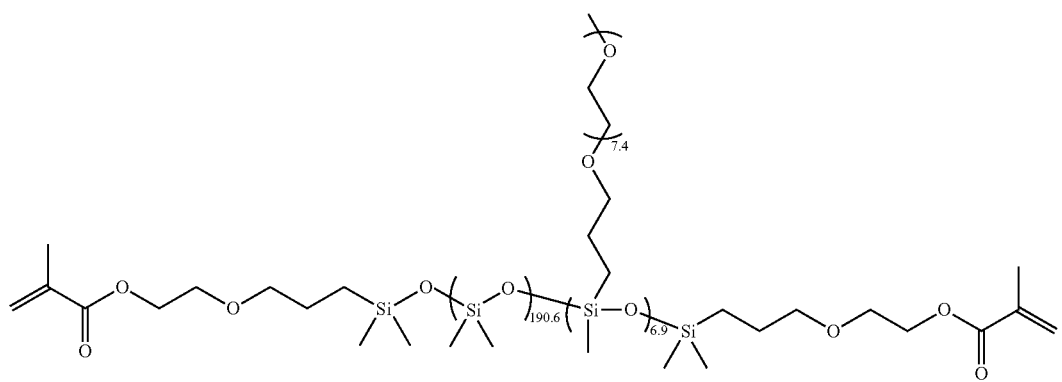

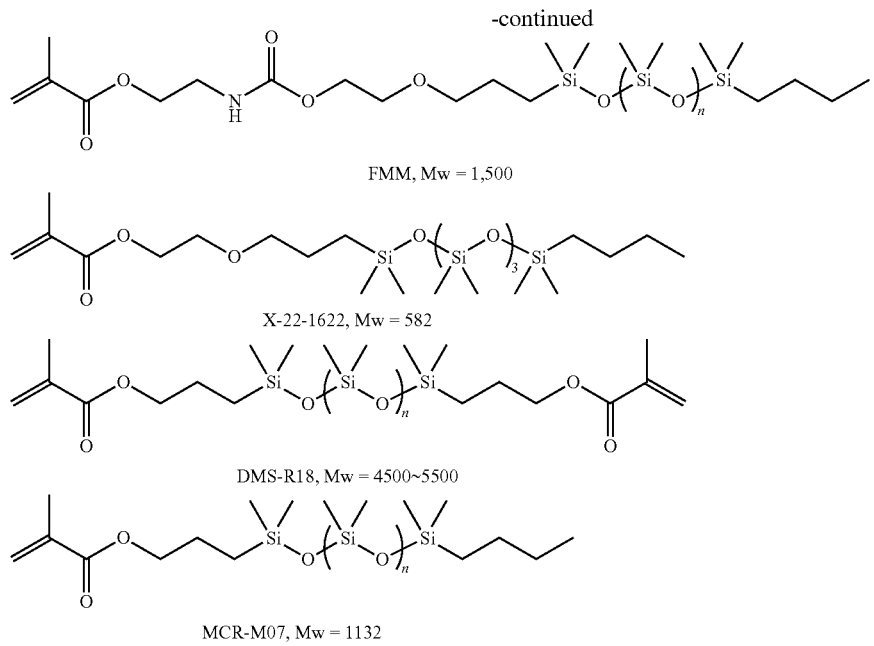

FMM, Mw = 1,500

X-22-1622, Mw = 582

DMS-R18, Mw = 4500~5500

MCR-M07, Mw = 1132

Yet other specific examples of the useful silicone-containing components useful in accordance with the present disclosure can be chemicals represented by the following formulas, or chemicals described in U.S. patent application publication number 2009/0234089, which is hereby incorporated by reference in its entirety. In one example, the silicone-containing component can comprise one or more a hydrophilic polysiloxane components represented by general formula (II),

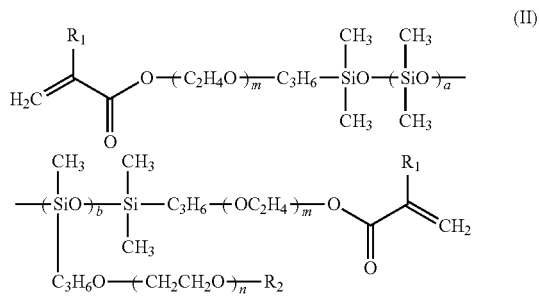

wherein $R_1$ is selected from either hydrogen or a methyl group; $R_2$ is selected from either of hydrogen or a $C_{1-4}$ hydrocarbon group; m represents an integer of from 0 to 10; n represents an integer of from 4 to 100; a and b represent integers of 1 or more; a+b is equal to 20-500; b/(a+b) is equal to 0.01-0.22; and the configuration of siloxane units includes a random configuration. Examples of such silicone-containing components are described in the Examples section of U.S. patent application publication number 2009/0234089, including Example 2 on page 7.

Other silicone-containing components also can be used. For example, other suitable types can include, for example, poly(organosiloxane) monomers, macromers or prepolymers such as α,ω-bismethacryloxy-propyl polydimethylsiloxane. Another example is mPDMS (inonomethacryloxy-propyl terminated mono-n-butyl terminated polydimethylsiloxane). Other useful silicone containing components include silicone-containing vinyl carbonate or vinyl carbamate monomers, macromers or prepolymers including, without limitation, 1,3-bis[4-(vinyloxycarb-onyloxy)but-1-yl]tetramethylisiloxane 3-(vinyloxycarbonyl-thio)propyl-[tris(trimethylsiloxysilane], 3-[tris(trimethylsiloxy)silyl]propyl allyl carbamate, 3-[tris(trimethylsiloxy) silyl]propyl vinyl carbamate; trimethylsilylethyl vinyl carbonate, and trimethylsilylmethyl vinyl carbonate. Examples of one or more of these silicone-containing components can be provided, for example, in U.S. Pat. No. 5,998,498 and U.S. Pat. Application Publication Nos. 2007/0066706 A1, 2007/0296914 A1, and 2008/0048350, all the disclosures of which are incorporated herein by reference.

Some of the silicone-containing monomers, macromers or prepolymers that can be used in accordance with the present disclosure can be used as a single discrete monomer, macromer or prepolymer, or can be used as a mixture of two or more discrete monomers, macromers or prepolymers. For example, MCR-M07 is often provided as a mixture of silicone-containing compounds with a wide distribution of molecular weights. Alternatively, some of the silicone-containing monomers, macromers or prepolymers that can be used in accordance with the present disclosure can be provided as two or more monomers, macromers or prepolymers with discrete molecular weights. For example, X-22-1625 is available in a lower molecular weight version with a molecular weight of about 9000 Daltons, and as a higher molecular weight version with a molecular weight of about 18,000 Daltons.

The polymerizable compositions for use as described herein may include one or more hydrophobic monomers, including silicone-free hydrophobic monomers. Examples of such silicone-free hydrophobic monomers include, without limitation, acrylic and methacrylic acids and derivatives thereof, including methylmethacrylate. Any combination of two or more hydrophobic monomers may be employed.

Hydrophilic Monomers. Hydrophilic monomers, including silicone-free hydrophilic monomers, are included in the polymerizable compositions used to make the present silicone hydrogels. The silicone-free hydrophilic monomers exclude hydrophilic compounds that contain one or more silicon atoms. Hydrophilic monomers can be used in combination with silicone-containing monomers, macromers or prepolymers in the polymerizable compositions to form silicone hydrogels. In silicone hydrogels, hydrophilic monomer components include those that are capable of providing at least about 10% (w/w), or even at least about 25% (w/w) water content to the resulting hydrated lens when combined with the other polymerizable composition components. For silicone hydrogels, the total hydrophilic monomers can be from about 25% (w/w) to about 75% (w/w), or from about 35% (w/w) to about 65% (w/w), or from about 40% (w/w) to about 60% (w/w), of the polymerizable composition.

Monomers that may be included as the hydrophilic monomers typically possess at least one polymerizable double bond, at least one hydrophilic functional group, or both. Examples of polymerizable double bonds include, for example, vinyl, acrylic, methacrylic, acrylamido, methacrylamido, fumaric, maleic, styryl, isopropenylphenyl, O-vinylcarbonate, O-vinylcarbamate, allylic, O-vinylacetyl and N-vinyl lactam and N-vinylamido double bonds. In one example, the hydrophilic monomers are vinyl-containing (e.g., an acrylic containing monomer or a non-acrylic vinyl containing monomer). Such hydrophilic monomers may themselves be used as crosslinking agents.

Such hydrophilic monomers may be, but are not necessarily, crosslinking agents. Considered as a subset of acryloyl moieties as described above, an "acrylic-type" or "acrylic-containing" or acrylate-containing monomer is a monomer containing the acrylic group (CR'H=CRCOX) wherein R is H or $CH_3$, R' is H, alkyl, or carbonyl, and X is O or N, which are also known to polymerize readily.

For silicone hydrogels, the hydrophilic component can comprise silicon-free hydrophilic monomer components comprising an acrylic monomer (e.g., a monomer with a vinyl group at the α-carbon position and a carboxylic acid terminus, a monomer with a vinyl group at the α-carbon position and an amide terminus, etc.) and hydrophilic vinyl-containing ($CH_2$=CH—) monomer (i.e., a monomer containing a vinyl group that is not part of an acrylic group).

Illustrative acrylic monomers include N,N-dimethylacrylamide (DMA), 2-hydroxyethyl acrylate, glycerol methacrylate, 2-hydroxyethyl methacrylate (HEMA), methacrylic acid, acrylic acid, methylmethacrylate (MMA), ethylene glycol methyl ether methacrylate (EGMA), and any mixtures thereof. In one example, the total acrylic monomer content is in an amount ranging from about 5% (w/w) to about 50% (w/w) of the polymerizable composition used to prepare a silicone hydrogel lens product, and can be present in an amount ranging from about 10% (w/w) to about 40% (w/w), or from about 15% (w/w) to about 30% (w/w), of the polymerizable composition.

As described above, the hydrophilic monomer also can comprise a hydrophilic vinyl-containing monomer. Hydrophilic vinyl-containing monomers that may be incorporated into the materials of the present lenses include, without limitation, the following: N-vinyl lactams (e.g. N-vinyl pyrrolidone (NVP)), N-vinyl-N-methyl acetamide (VMA), N-vinyl-N-ethyl acetamide, N-vinyl-N-ethyl formamide, N-vinyl formamide, N-2-hydroxyethyl vinyl carbamate, N-carboxy-β-alanine N-vinyl ester and the like and mixtures thereof. One example of a vinyl-containing monomer is N-vinyl-N-methyl acetamide (VMA). The structure of VMA corresponds to $CH_3C(O)N(CH_3)$—CH=$CH_2$. In one example, the total vinyl-containing monomer content of the polymerizable composition is in an amount ranging from about 0% to about 50% (w/w), e.g., up to about 50% (w/v), of the polymerizable composition used to prepare the silicone hydrogel lens product, and can be present in an amount ranging from about 20% (w/w) to about 45% (w/w), or from about 28% (w/w) to about 40% (w/w), of the polymerizable composition. Other silicone-free lens-forming hydrophilic monomers known in the art also may be suitable.

Additional examples are the hydrophilic vinyl carbonate or vinyl carbamate monomers disclosed in U.S. Pat. No. 5,070,215, which is incorporated in its entirety herein by reference, and the hydrophilic oxazolone monomers disclosed in U.S. Pat. No. 4,190,277, which is incorporated in its entirety herein by reference. Other suitable hydrophilic monomers will be apparent to one skilled in the art. More preferred hydrophilic monomers which may be incorporated into the polymer of the present disclosure include hydrophilic monomers such as N,N-dimethyl acrylamide (DMA), 2-hydroxyethyl acrylate, glycerol methacrylate, 2-hydroxyethyl methacrylamide, N-vinylpyrrolidone (NVP), and polyethyleneglycol monomethacrylate. In certain examples, hydrophilic monomers including DMA, NVP and mixtures thereof are employed.

Additional examples of materials used to make silicone hydrogel contact lenses include those materials disclosed in U.S. Pat. No. 6,867,245.

Crosslinking agents useful in producing the present contact lenses, such as the present silicone hydrogel contact lenses include, without limitation, the above-indicated crosslinking agents. Examples of acrylate-functionalized ethylene oxide oligomers for use in crosslinking agents can include oligo-ethylene oxide dimethacrylate. The crosslinking agent can be TEGDMA, TEGDVE, EGDMA, TMGDMA, or any combination thereof. Typically, the crosslinking agents are present in the polymerizable silicone hydrogel composition in relatively small total amounts in the polymerizable composition, such as in an amount ranging from about 0.1% (w/w) to about 10% (w/w), or from about 0.5% (w/w) to about 5% (w/w), or from about 0.75% (w/w) to about 1.5% (w/w), by weight of the polymerizable composition.

Additional Hydrogel Components. The polymerizable compositions used in the lenses and in the methods described herein can also include additional components, e.g., one or more initiators, such as one or more thermal initiators, one or more ultraviolet (UV) initiators, visible light initiators, any combination thereof, and the like, one or more UV absorber agents or compounds, or UV radiation or energy absorber, tinting agent, pigments, release agents, antimicrobial compounds, and/or other additives. The term "additive" in the context of the present disclosure refers to a compound or any chemical agent provided in the present hydrogel contact lens polymerizable compositions or the polymerized hydrogel contact lens products, but which is not necessary for the manufacture of a hydrogel contact lens.

The polymerizable compositions may comprise one or more initiator compounds, i.e., a compound capable of initiating polymerization of a polymerizable composition. Thermal initiators, i.e., initiators having a "kick-off" temperature, can be used. For instance, exemplary thermal initiators that can be employed in the present polymerizable compositions include 2,2'-azobiz(isobutyronitrile) (AIBN, VAZO®-64), 2,2'-azobis(2,4-dimethylpentanenitrile) (VAZO®-52), 2,2'-Azobis(2-methylbutyronitrile) (VAZO®-67), and 1,1'-azobis(cyclohexanecarbonitrile) (VAZO®-88). For VAZO® thermal initiators, the grade number (i.e., 64, 52, 67, 88, etc.) is the Celsius temperature at which the half-life of the initiator in solution is 10 hours. All of the VAZO® thermal initiators described herein are available from DuPont (Wilmington, Del., USA). Additional thermal initiators, including nitrites as well as other types of initiators, are available from Sigma Aldrich. Ophthalmically compatible silicone hydrogel contact lenses can be obtained from polymerizable compositions that comprise from about 0.05% (w/w) to about 0.8% (w/w), or from about 0.1% (w/w) to about 0.6% (w/w), of VAZO®-64 or other thermal initiator.

A UV absorber may be, e.g., a strong UV absorber that exhibits relatively high absorption values in the UV-A range of about 320-380 nanometers, but is relatively transparent above about 380 nm. Examples include photopolymerizable hydroxybenzophenones and photopolymerizable benzotriazoles, such as 2-hydroxy-4-acryloyloxyethoxy benzophenone, commercially available as CYASORB UV416 from Cytec Industries, West Paterson, N.J., USA, 2-hydroxy-4-(2 hydroxy-3-methacrylyloxy)propoxybenzophenone, and photopolymerizable benzotriazoles, commercially available as NORBLOC® 7966 from Noramco, Athens, Ga., USA. Other photopolymerizable UV absorbers suitable for use in accordance with the present disclosure include polymerizable, ethylenically unsaturated triazines, salicylates, aryl-substituted acrylates, and mixtures thereof. Generally speaking, a UV absorber, if present, is provided in an amount corresponding to about 0.5 weight percent of the polymerizable composition to about 1.5 weight percent of the composition. For example, compositions can include from about 0.6% (w/w) to about 1.0% (w/w) of one or more UV absorbers.

The polymerizable compositions useful in accordance with the present disclosure may also include a tinting agent, although both tinted and clear lens products are contemplated. In one example, the tinting agent is a reactive dye or pigment effective to provide color to the resulting lens product. Tinting agents can include, for example, VAT Blue 6 (7,16-Dichloro-6,15-dihydroanthrazine-5,9,14,18-tetrone), 1-Amino-4-[3-(beta-sulfatoethylsulfonyl)anilio]-2-anthraquinonesulfonic acid (C. I. Reactive Blue 19, RB-19), a copolymer of Reactive Blue 19 and hydroxyethylmethacrylate (RB-19 HEMA) 1,4-bis[4-[(2-methacryl-oxyethyl) phenylamino]anthraquinone (Reactive Blue 246, RB-246, available from Arran Chemical Company, Athlone, Ireland), 1,4-Bis[(2-hydroxyethyl)amino]-9,10-anthracenedione bis (2-propenoic)ester (RB-247), Reactive Blue 4, RB-4, or a copolymer of Reactive Blue 4 and hydroxyethyl methacrylate (RB-4 HEMA or "Blue HEMA"). Other exemplary tinting agents are disclosed for example, in U.S. Patent Application Publication No. 2008/0048350, the disclosure of which is incorporated in its entirety herein by reference. Other suitable tinting agents for use in accordance with the present disclosure are phthalocyanine pigments such as phthalocyanine blue and phthalocyanine green, chromic-alumina-cobaltous oxide, chromium oxides, and various iron oxides for red, yellow, brown and black colors. Opaquing agents such as titanium dioxide may also be incorporated. For certain applications, a mixture of colors may be employed. If employed, tinting agents can be present in an amount ranging from about 0.1% (w/w) to about 15% (w/w), or about 1% (w/w) to about 10% (w/w), or about 4% (w/w) to about 8% (w/w).

The polymerizable compositions may also comprise a demolding aid, that is to say, one or more ingredients effective in making more facile removal of the cured contact lenses from their molds. Exemplary demolding aids include hydrophilic silicones, polyalkylene oxides, and any combination thereof. The polymerizable compositions may additionally comprise a diluent selected from the group consisting of hexanol, ethoxyethanol, isopropanol (IPA), propanol, decanol and any combination thereof. Diluents, if employed, are typically present in amounts ranging from about 10% (w/w) to about 30% (w/w). Compositions having relatively higher concentrations of diluents tend to, but do not necessarily, have lower ionoflux values, reduced modulus, and increased elongation, as well as water break up times (WBUTs) greater than 20 seconds. Additional materials suitable for use in making hydrogel contact lenses are described in U.S. Pat. No. 6,867,245, the disclosure of which is incorporated in its entirety herein by reference. In certain examples however, the polymerizable composition is diluent-free.

In a particular example of a polymerizable composition, the composition comprises a first monomer having a first reactivity ratio, and a second monomer having a second reactivity ratio that is less than the first reactivity ratio. As understood by persons or ordinary skill in the art, a reactivity ratio can be defined as the ratio of the reaction rate constant of each propagating species adding its own monomer to the rate constant for its addition of other monomer. Such compositions may also include at least one cross-linking agent having a reactivity ratio similar to the first reactivity ratio or to the second ratio. Such compositions may also include at least two crosslinking agents, the first crosslinking agent having a reactivity ratio similar to the first reactivity ratio, and the second crosslinking agent having a reactivity ratio similar to the second reactivity ratio. In certain examples, the lens precursor compositions may include one or more removable additives. For example, the polymerizable compositions may include one or more compatibilizers, demolding aids, delensing aids, wettability enhancers, and ionoflux reducers which are removable.

Silicone-containing hydrogel contact lenses are frequently referred to as silicone hydrogel contact lenses. Many silicone hydrogel contact lenses are based on polymerizable lens formulations that include siloxane monomers, macromers, prepolymers or any combination thereof, and at least one hydrophilic monomer, as previously described. Some examples of silicone hydrogel contact lens materials include materials having the following USANs: acquafilcon A or aquafilcon B, balafilcon A, comfilcon A, enfilcon A, galyfilcon A, lenefilcon A, lotrafilcon A, lotrafilcon B, senofilcon A, narafilcon A, and filcon II 3. In one example, the lens body with ophthalmically acceptably wettable anterior and posterior surfaces without application of a surface treatment to the lens body, or without the presence of a interpenetrating polymeric network (IPN) of a polymeric wetting agent in the lens body is a comfilcon A silicone hydrogel contact lens body.

A method of manufacturing ophthalmic lenses, for example, silicone hydrogel contact lenses, is illustrated in FIG. 1. In accordance with the present disclosure, all of the steps illustrated in FIG. 1, or a subset of the steps illustrated in FIG. 1 can comprise a method of manufacturing ophthalmic lenses. Items which serve as inputs, outputs or both inputs and outputs of the steps of FIG. 1 are illustrated in FIG. 2.

FIG. 1 includes a step 102 of providing a vinyl alcohol copolymer with high amorphous content. The vinyl alcohol copolymer with high amorphous content is illustrated in FIG. 2 as element 202.

Step 104 of FIG. 1 illustrates the step of using the vinyl alcohol copolymer with high amorphous content to form at least one of a first mold member and a second mold member, or to form at least one molding surface of at least one of a first mold member and a second mold member. Element 204 of FIG. 2 illustrates the resulting mold member or molding surface comprising the vinyl alcohol copolymer with his amorphous content.

FIG. 1 also includes a step 106 of placing a polymerizable composition on or in a mold member. In reference to the present disclosure, the polymerizable composition can be understood to be a lens forming composition, such as, for example, a polymerizable silicone hydrogel contact lens forming composition. The polymerizable composition is illustrated in FIG. 2 as element 206. The polymerizable composition may be understood to be a pre-polymerized or pre-cured composition suitable for polymerization.

Typically, the polymerizable composition or lens precursor composition is not polymerized before curing or polymerization of the composition. However, polymerizable compositions or lens precursor compositions may be partially polymerized before undergoing a curing process. In some examples, the polymerizable composition may comprise a polymer component which becomes crosslinked with other components of the polymerizable composition during the curing process. The polymeric component can be a polymeric component which is not a polymeric wetting or comfort agent, which does not form an interpenetrating polymeric network in the lens body, or which is neither a polymeric wetting or comfort agent and does not form an IPN in the lens body.

The present lens precursor compositions can be provided in containers, dispensing devices, or mold members prior to a curing or polymerization procedure, as described herein. Referring back to FIG. 1, in step 106, the lens precursor composition is placed on a lens forming surface (i.e., a region used to mold a lens surface) of a female mold member or of a male mold. The female mold member can be understood to be a first mold member or an anterior mold member, and the male mold member can be understood to be a second mold member or a posterior mold member. For example, the female mold member comprises a molding surface that defines the anterior or front surface of a lens produced from the lens mold. The second mold member may be understood to be a male mold member or a posterior mold member. For example, the second mold member includes a molding surface that defines the posterior surface of a lens produced in the lens mold (i.e., the second or male mold member has a convex lens forming surface).

Further in reference to the present disclosure, at least one of the first and second mold members, or a molding surface of at least one of the first and second mold members comprises, includes, includes a major amount of, consists essentially of, or consists of a vinyl alcohol copolymer with high amorphous content as described herein. In one example, the mold member(s) or molding surface(s) as described herein have been produced to have molding surfaces with sufficient degrees of polarity to produce silicone hydrogel contact lenses having ophthalmically acceptably wettable surfaces, such as, for example, an average polarity from about 0.25% to about 8%, from about 1% to about 7%, from 2% to about 5%, from about 1% to about 4%, or of about 3%. The average polarity of the polymer can be determined based on the Owens-Wendt-Rabel-Kaebel model, where the contact angle of the thermoplastic polymer is determined using a number of different liquids of known polarities. The Owens-Wendt-Rabel-Kaebel equation can be written in the form of a linear equation, where y is calculated based on the observed contact angle of each of the different liquids with the polymer (θ) and x is calculated based on the known polar ($\sigma_L^P$) and disperse ($\sigma_L^D$) components of the total surface energy ($\sigma_L^T$) of each of the different liquids. The data points from the different liquids (x,y) can be plotted, and the linear regression of the plot can then be used to determine the slope (m) and y-intercept (b). The calculated slope and y-intercept can then be used to calculate the polar ($\sigma_S^P$) and disperse ($\sigma_S^D$) components of the total surface energy of the polar thermoplastic polymer ($\sigma_S^T$, where $\sigma_S^T = \sigma_S^P + \sigma_S^D$).

The Owens-Wendt-Rabel-Kaebel Equation in the form of a linear equation:

$$\frac{\sigma_L(\cos\theta + 1)}{2\sqrt{\sigma_L^D}} = \frac{\sqrt{\sigma_S^P}\sqrt{\sigma_L^P}}{\sqrt{\sigma_L^D}} + \sqrt{\sigma_S^D}$$

where $$y = \frac{\sigma_L(\cos\theta + 1)}{2\sqrt{\sigma_L^D}}, m = \sqrt{\sigma_S^P}, x = \frac{\sqrt{\sigma_L^P}}{\sqrt{\sigma_L^D}}, \text{ and}$$

$$b = \sqrt{\sigma_S^D}.$$

Examples of the liquids with different polarities which can be used to determine average polarity of the polymer include, but are not limited to, deionized water, diiodomethane, dimethyl sulfoxide (DMSO), and formamide. In selecting the liquids with different polarities, ideally, a number of liquids having a range of polarities based on the liquid's polar component ($\sigma_L^P$) of total surface energy would be selected, rather than selecting a number of liquids with different total surface energies ($\sigma_L^T$). Using this method, the average polarity of the polymer is calculated by dividing the calculated polar component ($\sigma_S^P$) of total surface energy for the polymer by its calculated total surface energy ($\sigma_S^T$) and multiplying by 100 to obtain the percent polarity.

To form a mold assembly, the first mold member is placed in contact with a second mold member, forming a contact lens-shaped cavity in the space between the first mold member and the second mold member. The method illustrated in FIG. 1 includes a step 108 of forming a contact lens mold assembly by placing two contact lens mold members in contact with each other to form a lens-shaped cavity therebetween. For example, with reference to FIG. 2, following execution of step 108, the polymerizable silicone hydrogel lens precursor composition 206 is located in the contact lens shaped cavity.

At step 110, the method illustrated in FIG. 1 includes curing the polymerizable composition to form a polymerized lens body which is contained in a mold assembly, as illustrated in FIG. 2 as element 208. At this point in the process, the polymerized lens body has not been exposed to a liquid. In one example the polymerized lens body can be a polymerized silicone hydrogel contact lens body. During curing, the components of the polymerizable composition polymerize to form a polymerized lens body. Thus, the curing may also be understood to be a polymerizing step. The curing 110 can include exposing the polymerizable lens precursor composition to a form of electromagnetic radiation effective in polymerizing the components of the lens precursor composition. For example, the curing 110 can include exposing the polymerizable composition to polymerizing amounts of heat or ultraviolet (UV) light, among other forms of electromagnetic radiation. The curing 110 can also include curing the compositions in an oxygen-free or nearly oxygen-free environment. For example, the curing 110 can occur in the presence of nitrogen or other inert gases. The curing 110 can be effective to fully polymerize the polymerizable composition, or can polymerize the polymerizable composition to a level such that the lens body when processed (e.g., demolded, delensed, washed, packaged, sterilized, etc.) is capable of retaining its molded shape adequately to serve as a contact lens.

A polymerized lens body which has not been exposed to a liquid can be present at various stages in the manufacturing process, depending upon the types of demolding and delensing processes used, and whether or not one or more optional washing steps are performed. For example, a polymerized lens body which has not been exposed to a liquid can be a polymerized lens body prior to undergoing a wet demolding process, a wet delensing process, a wet demolding and delensing process, an optional washing process, and any combination thereof. For example, the washing process can be a cleaning process to remove dust or debris, an extraction process to remove a portion or substantially all of one or more extractable components from the polymerized lens body, or a hydration process to partially or fully hydrate the hydrogel lens body. For example, the polymerized lens body which has not been contacted by a liquid can comprise a lens body present in a lens shaped cavity of a mold assembly or of two molding surfaces after a curing process, can comprise a lens body in contact with one and only mold member following a dry demolding process, or can comprise a contact lens body in a tray or other device following dry delensing and dry delensing processes. The polymerized lens body which has not been exposed to a liquid can include a lens forming component, such as a silicon-containing polymeric network or matrix in the shape of a lens, and a removable component that can be removed from the lens body following polymerization. The removable component can be understood to include unreacted monomers, oligomers, partially reacted monomers, or other agents which have not become covalently attached or otherwise immobilized relative to the lens-forming component. The removable component can also be understood to include one or more additives, including diluents, that can be removed from the polymerized lens product during a cleaning, extraction, or hydration procedure, as discussed herein. Thus, materials of the removable component can include linear uncross-linked or slightly cross-linked or branched polymers of extractable materials that are not cross-linked to or otherwise immobilized relative to the polymer backbone, network, or matrix of the lens body.

After curing the polymerizable compositions, the method illustrated in FIG. 1 includes a step 112 of separating the polymerized lens body from the mold members. In one example, the process of separating the polymerized lens body from the mold member can comprise a demolding process resulting in the polymerized lens body remaining in contact with one, and only one, mold member of the mold members used to form the lens body. Following the demolding process, the polymerized lens body is located on, or remains in contact with just one of the mold members of the mold assembly. The one and only one mold member with which the lens body remains in contact following demolding can be the mold member 204 formed using the vinyl alcohol copolymer 202, or can be a different mold member. When the step 112 of separating the polymerized lens body from the mold members comprises a demolding process, the step of separating can further include a delensing step releasing the lens body from the one and only one mold member with which it remained in contact following the demolding process. The lens body can be delensed from the male mold member or the female mold member, depending on which mold member the polymerized lens body remained in contact with following the demolding process. Alternatively, the step 112 can comprise a combination demolding and delensing process, where the lens body is released simultaneously from all of the mold members used to form it. When at least one of the mold members or molding surfaces used to form the lens body comprises the vinyl alcohol copolymer with high amorphous content, the separating process can involve applying a liquid to the lens body and at least one mold member or molding surface (in the form of a mold assembly, a single mold member, a pair of molding surfaces or a molding surface, the molding surface(s) being either in contact with, or separated from, the non-molding region(s) of the mold member(s)) to at least partially dissolve the vinyl alcohol copolymer and thereby release the lens body from the mold assembly, single mold member or molding surface(s). The liquid used in a wet separation process can comprise water or an aqueous solution.

The method illustrated in FIG. 1 optionally includes a step 114 of washing the lens body by contacting the polymerized lens body with a liquid, for example an organic solvent, an organic solvent solution, water or an aqueous solution, to clean dust or debris from the lens body, to extract the lens body to remove extractable materials from the lens body, or to fully or partially hydrate the lens body. In one example, the washing step 114 can comprise a washing step to remove or dilute the liquid used during a wet demolding process, a wet delensing process, or both. The washing step 114 results in a cleaned, extracted or hydrated lens body 210, as shown in FIG. 2. The washing step 114 can optionally be conducted on a mold assembly including a polymerized lens body, a polymerized lens body remaining in contact with one mold member, a lens body which has been fully released from all the molds used to form it, and can be conducted repeatedly during the manufacturing process.

The washing step 114 can optionally include a step of hydrating the polymerized lens body. The hydrating step can include contacting a polymerized lens body or one or more batches of such lens bodies with water or an aqueous solution to form a hydrated lens product, such as, for example, a silicone hydrogel contact lens. The hydration step can fully or partially hydrate the lens body. In one example, the polymerized lens body which is hydrated in the hydration step is a delensed polymerized lens body which has not been contacted by a liquid prior to the hydration step, or can comprise a polymerized lens body which has previously been contacted by a liquid.

After the separating step 112, and the optional washing step 114, the method illustrated in FIG. 1 can optionally include a step 116 of packaging the lens body to produce a packaged ophthalmic lens product 212. For example, the lens body can be placed in a blister pack, vial or other suitable container along with a volume of a packaging liquid, such as a saline solution, including buffered saline solutions. In one example, the washing step 114 and packaging step 116 can be conducted simultaneously by placing a polymerized lens body, including a polymerized lens body which has not previously been contacted by a liquid, in a blister package or container with a portion of packaging liquid which serves as both a packaging solution and a washing solution. In another example, the separating and packaging step can be conducted simultaneously by placing a polymerized lens body in contact with a mold assembly, two molding surfaces of a mold assembly, a mold member, or a molding surface in a blister package or container with a portion of packaging liquid which serves to release the lens body by dissolving the vinyl alcohol copolymer mold member(s) or molding surface(s).

Optionally, the method illustrated in FIG. 1 can further comprise one or more inspection steps 118. In the example illustrated in FIG. 1, the inspection step is conducted following the packaging step, before the package is sealed and sterilized, although the one or more inspection steps can be conducted at any point in the process, either before curing or after curing, on a dry lens or a wet lens. For example, an inspection can be performed on one or more mold members to determine the acceptability of the molding surfaces, can be performed on a mold member following placing of the polymerizable composition to detect the presence of bubbles in the polymerizable composition, on the dry lens following curing to determine the acceptability of the dry lens body, or on the wet lens body following separating, washing or packaging to determine the acceptability of the wet lens body. The result of optional inspection step(s) 118 as illustrated in FIG. 1 is a packaged inspected body 214, but in other processes can comprise an inspected mold member, an inspected polymerizable composition in a mold member, an inspected dry lens body, or an inspected wet lens body.

Following the step 116 of packaging the lens body, the blister pack or container containing the packaged lens body 212 can be sealed, and subsequently sterilized, as shown in optional step 120 of FIG. 1, to produce a sterilized package comprising an ophthalmic lens product such as, for example, a contact lens. The packaged lens body can be exposed to sterilizing amounts of radiation, including heat, such as by autoclaving, gamma radiation, e-beam radiation, ultraviolet radiation, and the like. Depending upon the previous process steps used, the sterilization process can also serve to partially or fully extract, fully hydrate, or both extract and hydrate the packaged lens body, or to dissolve the mold member(s) or molding surface(s) comprising the vinyl alcohol copolymer.

The following non-limiting Examples illustrate certain aspects of the present methods and devices.

Example 1 (Comparative, Theoretical)

A quantity of ethylene-vinyl alcohol copolymer with low amorphous content is provided in granular or pellet form. A portion of the polymer is processed by conventional injection molding into contact lens mold members. A polymerizable composition for producing silicone hydrogel contact lenses is prepared as described herein, and is used to prepare a plurality of cast-molded polymerized silicone hydrogel lens bodies as illustrated in FIG. 1. The mold assemblies including the polymerizable composition are cured using thermal or UV radiation. After curing, the mold assemblies including the cast-molded polymerized lens bodies are wet or dry demolded to separate the two mold members of the mold assembly. Following the dry demolding step, a wet delensing process is used to release the polymerized lens bodies from the one mold member with which they remain in contact following the demolding step. The released lens bodies are subsequently either washed using a liquid comprising an organic solvent followed by an aqueous solution essentially free of an organic solvent, or are washed using an aqueous solution essentially free of an organic solvent. The washing step can include an additional hydration step, or a separate hydration step can be included before the lens bodies are packaged and sterilized. The yield of acceptable lens bodies is below about 65%.

Example 2 (Theoretical)

A quantity of vinyl alcohol copolymer with high amorphous content is provided in granular or pellet form. A portion of the polymer is processed by conventional injection molding into contact lens mold members. A polymerizable composition for producing silicone hydrogel contact lenses is prepared as described herein, and is used to prepare a plurality of cast-molded polymerized silicone hydrogel lens bodies as illustrated in FIG. 1. The mold assemblies including the polymerizable composition are cured using thermal or UV radiation. After curing, the mold assemblies including the cast-molded polymerized lens bodies are wet or dry demolded to separate the two mold members of the mold assembly. Following the dry demolding step, a wet delensing process is used to release the polymerized lens bodies from the one mold member with which they remain in contact following the demolding step. The released lens bodies are subsequently either washed using a liquid comprising an organic solvent followed by an aqueous solution essentially free of an organic solvent, or are washed using an aqueous solution essentially free of an organic solvent. The washing step can include an additional hydration step, or a separate hydration step can be included before the lens bodies are packaged and sterilized. The yield of acceptable lens bodies is greater than about 75%. When the manufacturing process involving minimal handling of the lens body, where the mold assembly is placed in the blister package and the lens body is demolded and delensed by dissolving the mold assembly in the blister package, followed by washing the lens body in the blister package, the yield of acceptable lens bodies is greater than about 85%.

Example 3 (Theoretical)

A quantity of Nichigo G-Polymer™ vinyl alcohol copolymer with high amorphous content is provided in granular or pellet form. A portion of the polymer is processed by conventional injection molding into male and female contact lens mold members. A polymerizable composition for producing silicone hydrogel contact lenses is prepared as described herein, and is used to prepare a plurality of cast-molded polymerized silicone hydrogel lens bodies as illustrated in FIG. 1. The mold assemblies including the polymerizable composition are cured using thermal or UV radiation. After curing, the mold assemblies including the cast-molded polymerized lens bodies are simultaneously wet demolded and delensed by placing the mold assembly including the polymerized lens body into a tray, and applying liquid to the mold assembly to at least partially dissolve the vinyl alcohol copolymer, thereby releasing the lens body from both molds of the mold assembly. Optionally, the mold assemblies, the mold members, or the liquid can be agitated during the demolding and delensing steps. The released lens bodies are subsequently transferred to a blister package with packaging solution, and are sealed and sterilized.

What is claimed is:
1. A method of manufacturing an ophthalmic lens, comprising:
(a) providing at least one vinyl alcohol copolymer with high amorphous content wherein the at least one vinyl alcohol copolymer with high amorphous content is a vinyl alcohol copolymer with an average level of crystallinity from about 10% to about 25%;

(b) using the at least one vinyl alcohol copolymer with high amorphous content to form at least one of a first mold member and a second mold member, the first mold member comprising a concave molding surface configured to mold an anterior surface of a lens and the second mold member comprising a convex molding surface configured to mold a posterior surface of a lens, the first mold member and the second mold member configured to form a lens-shaped cavity therebetween when combined as a mold assembly;

(c) placing a polymerizable composition comprising at least one hydrophilic monomer in the first mold member or the second mold member;

(d) assembling the mold assembly by contacting the first mold member and the second mold member so as to form the lens-shaped cavity therebetween with the polymerizable composition contained in the lens-shaped cavity of the mold assembly; and (e) curing the polymerizable composition in the mold assembly to form a cast-molded polymerized reaction product in the lens-shaped cavity of the mold assembly, the polymerized reaction product comprising an ophthalmic lens body.

2. The method of claim 1, wherein the at least one vinyl alcohol copolymer with high amorphous content is a vinyl alcohol copolymer with an average level of crystallinity from about 15% to about 25%.

3. The method of claim 1, wherein the at least one vinyl alcohol copolymer with high amorphous content has a melting point from about 140° C. to about 190° C.

4. The method of claim 1, wherein the at least one vinyl alcohol copolymer with high amorphous content has a glass transition temperature from about 60° C. to about 85° C.

5. The method of claim 1, wherein the step of placing the polymerizable composition in one of the first mold member or the second mold member comprises placing a polymerizable composition comprising at least one silicone monomer, silicone macromer, silicone prepolymer, or combination thereof, and at least one hydrophilic monomer in the first mold member, and wherein the ophthalmic lens body comprises a silicone hydrogel contact lens body.

6. The method of claim 1, wherein the step of using the at least one vinyl alcohol copolymer with high amorphous content to form at least one of the first mold member and the second mold member comprises injection molding the at least one of the first mold member and the second mold member.

7. The method of claim 6, wherein injection molding the at least one of the first mold member and the second mold member comprises forming a molding surface of at least one of the first mold member and the second mold member completely by injection molding.

8. The method of claim 6, wherein injection molding the at least one of the first mold member and the second mold member comprises forming a body of at least one of the first mold member and the second mold member by injection molding, and forming a molding surface of the at least one of the first mold member and the second mold member by machining, lathing or ablating the injection molded body.

9. The method of claim 6, wherein the process of injection molding the vinyl alcohol copolymer with high amorphous content uses a process setting selected from the group consisting of: melt temperature from about 180° C. to about 250° C., barrel temperature from about 180° C. to about 250° C., throat temperature from about 30° C. to about 70° C., mold tool temperature from about 30° C. to about 95° C., holding time from about 1 second to about 5 seconds, injection speed from about 50 mm/second to about 250 mm/second, plasticizing speed from about 100 mm/second to about 300 mm/second, injection pressure from about 50 Bar to about 180 Bar, holding pressure from about 10 Bar to about 200 Bar, back pressure from about 5 Bar to about 25 Bar, and any combination thereof.

10. The method of claim 1, wherein the step of using the at least one vinyl alcohol copolymer with high amorphous content to form at least one of the first mold member and the second mold member comprises using the at least one vinyl alcohol copolymer with high amorphous content to form a molding surface on the at least one of the first mold member and the second mold member, the non-molding region of the at least one of the first mold member and the second mold member being formed of a second material, and wherein the step of placing the polymerizable composition in the first mold member or the second mold member comprises placing the polymerizable composition in direct contact with the molding surface comprising the vinyl alcohol copolymer with high amorphous content.

11. The method of claim 1, wherein the lens body has ophthalmically acceptably wettable anterior and posterior surfaces without application of a surface treatment to the lens body, or without the presence of components in the polymerizable composition that form an interpenetrating network (IPN) of a wetting agent in the lens body during the curing.

12. The method of claim 1, wherein the method further comprises the step of separating the mold assembly, the separating resulting in the lens body remaining in contact with one and only one of the first mold member and the second mold member, the one and only one of the first mold member and the second mold member being the at least one of the first mold member and the second mold member comprising the at least one vinyl alcohol copolymer with high amorphous content, or resulting in the lens body being released from all of mold members used to form the lens body.

13. The method of claim 12, wherein the step of separating the cured mold assembly comprises applying a liquid to the at least one of the first mold member and the second mold member comprising the at least one vinyl alcohol copolymer with high amorphous content, resulting in the at least one of the first mold member and the second mold member comprising the at least one vinyl alcohol copolymer with high amorphous content at least partially dissolving in the liquid.

14. The method of claim 13, wherein the applying the liquid further comprises agitating the liquid, or agitating the at least one of the first mold member and the second mold member comprising the at least one vinyl alcohol copolymer with high amorphous content.

15. The method of claim 13, wherein the dissolving the at least one of the first mold member and the second mold member comprising the at least one vinyl alcohol copolymer with high amorphous content is conducted at a temperature of about 70° C. or less, and the at least one of the first mold member and the second mold member comprising the at least one vinyl alcohol copolymer with high amorphous content is completely dissolved in less than about 240 minutes.

16. The method of claim 1, wherein the method further comprises the step of placing the mold assembly including the cured lens body in the lens-shaped cavity in a blister package with a packaging solution, and sealing and sterilizing the package, wherein the mold assembly is fully dissolved in the packaging solution following sterilization.

17. The method of claim 16, wherein the molding surface of at least one of the first mold member and the second mold member comprises the at least one vinyl alcohol copolymer with high amorphous content, and the non-molding region of the at least one first mold member or the second mold member is formed of at least one polymeric material that is insoluble in the packaging solution and is configured for use as a blister package.

* * * * *